(12) United States Patent
Matsumoto

(10) Patent No.: US 6,397,116 B1
(45) Date of Patent: May 28, 2002

(54) PRODUCTION CONTROL SYSTEM AND METHOD

(75) Inventor: Shigeru Matsumoto, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/417,096

(22) Filed: Oct. 13, 1999

(30) Foreign Application Priority Data

Oct. 19, 1998 (JP) ............................................. 10-296883

(51) Int. Cl.[7] .............................................. G06F 19/00
(52) U.S. Cl. .............................. 700/96; 700/96; 700/95; 709/202
(58) Field of Search ............................. 700/2, 19, 108, 700/86, 49, 95, 96, 121, 100, 103, 104; 709/202, 203, 223, 241; 714/55

(56) References Cited

U.S. PATENT DOCUMENTS 5,204,955 A * 4/1993 Kagei et al. ................. 709/223
5,946,464 A * 8/1999 Kito et al. ................... 709/202
5,963,447 A * 10/1999 Kohn et al. .................... 700/49
6,041,344 A * 3/2000 Bodamer et al. ........... 709/203

FOREIGN PATENT DOCUMENTS

JP          10-124432          5/1998

* cited by examiner

Primary Examiner—Leo Picard
Assistant Examiner—Steven R. Garland
(74) Attorney, Agent, or Firm—Eric J. Robinson; Nixon Peabody LLP

(57) ABSTRACT

The production control system of this invention includes a request system for setting executive functions to be executed for controlling apparatuses installed in manufacturing plants, and an agent system for instructing execution systems for controlling the apparatuses installed in the manufacturing plants to execute the executive functions. The agent system is connected with the request system or the execution systems through a computer network. Therefore, the request system controls the apparatuses installed in the manufacturing plants through the agent system.

35 Claims, 19 Drawing Sheets

Fig. 5(a)

Function setting format

Function execution part
   1, Command= abc
   2, Command= def
   3, Command= 123
   4, SQL= select column from table
   5, SQL= delete tables where column2 = 'data'
   6, HTTP address= http://170.1.2.3/xyz
   7, Execution place=FactoryA, FactoryB, LaboratoryC Function end part
   1, Command= abc
   2, Command= def
   3, Command= 123
   4, SQL= select column from table
   5, SQL= delete tables where column2 = 'data'
   6, HTTP address= http://170.1.2.3/xyz
   7, Execution place=FactoryA, FactoryB, LaboratoryC

Fig. 5(b)

Function setting file

Function execution part
   1, Command=Yield accumulation 1
   2, Execution place=FactoryA, FactoryE, FactoryF Function end part
   1, Command= Priority lot dedicated processing 1
   2, Execution place=LaboratoryC

Fig. 6(a)

Start condition setting format

1, Function=START,END,STOP,Re-START,RUNNING
2, State of lot=WAIT,PROCESS,STOP,END
3, State of apparatus=PROCESS,IDLE,DOWN,MAINTENANCE,GO-ON,GO-DOWN
4, Time 1=YY:MM:DD:HH:MM:SS
5, Time 2=MM minutes after(before)
6, Condition number=S123
7, Combination=(1 and 2) or (1 and 4)

Fig. 6(b)

Start condition setting file 1,
2, Higher priority lot = END
3,
4,
5, Time 2 = 0
6,
8, Combination = 2 and 5

End condition setting format

1, Function = START, END, STOP, Re-START, RUNNING
2, State of lot = WAIT, PROCESS, STOP, END
3, State of apparatus = PROCESS, IDLE, DOWN, MAINTENANCE, GO-ON, GO-DOWN
4, Time 1 = YY : MM : DD : HH : MM : SS
5, Time 2 = MM minutes after (before)
6, Ending system = System abc
7, Condition number = E123
8, Combination = (1 and 2) or (1 and 4)

Fig. 7 (a)

End condition setting file 1,
2, Higher priority lot = END
3,
4,
5, Time 2 = 0
6,
7,
8, Combination = 2 and 5

Command conversion table

| Execution place | Command | Local command | System name | Inquiry method |
|---|---|---|---|---|
| ... | ... | ... | ... | ... |
| Factory A | Yield accumulation 1 | YIELD1 | PRINCE | SQL |
| Factory A | Yield accumulation 2 | YIELD2 | PRINCE | SQL |
| Factory A | TAT accumulation 1 | LEAD1 | AMICA | SHELL |
| Factory A | Delivery date reply 1 | NOUKI1 | DYSCHE | Command 1 |
| Factory A | ... | ... | ... | ... |
| ... | ... | ... | ... | ... |
| Laboratory C | Priority lot dedicated process 1 | PTC1 | SOLOM | Command 1 |
| Laboratory C | Closing number limit 1 | PTC43 | ISEDAS | Command 2 |
| Laboratory C | ... | ... | ... | ... |
| ... | ... | ... | ... | ... |
| Factory E | Yield accumulation 1 | BUDO23 | PERAL | SQL |
| Factory E | TAT accumulation 1 | TAT-01 | ESCORT | Command 2 |
| ... | ... | ... | ... | ... |
| Factory F | Yield accumulation 1 | COM24 | INSPCT | SHELL |
| Factory F | ... | ... | ... | ... |
| ... | ... | ... | ... | ... |
| Factory X | TAT accumulation 1 | TAT1 | PROFIT | SHELL |
| Factory X | Delivery date reply 1 | NOUKI-1 | MASCOT | SHELL |
| ... | ... | ... | ... | ... |

Fig. 9

Result return file

Place= Factory A

System name= PRINCE

Local command= YIELD1

Execution result= 76%

Fig. 10

Result return file

Place=Laboratory C

System name= SOLOM

Local command= PTC1

Execution result= 1998/07/20 15:18 Nomal termination

Fig. 13(a)

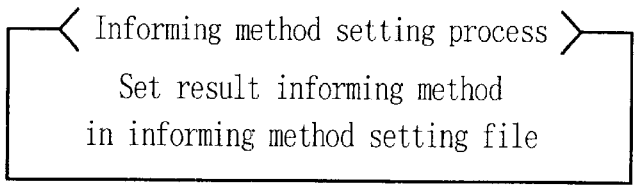

Informing method setting process
Set result informing method in informing method setting file

Fig. 13(b)

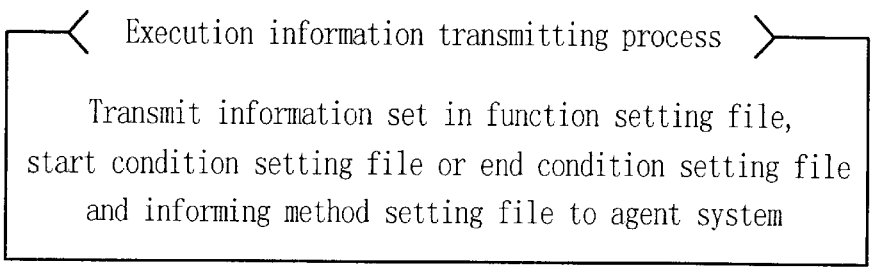

Execution information transmitting process
Transmit information set in function setting file, start condition setting file or end condition setting file and informing method setting file to agent system

Fig. 13(c)

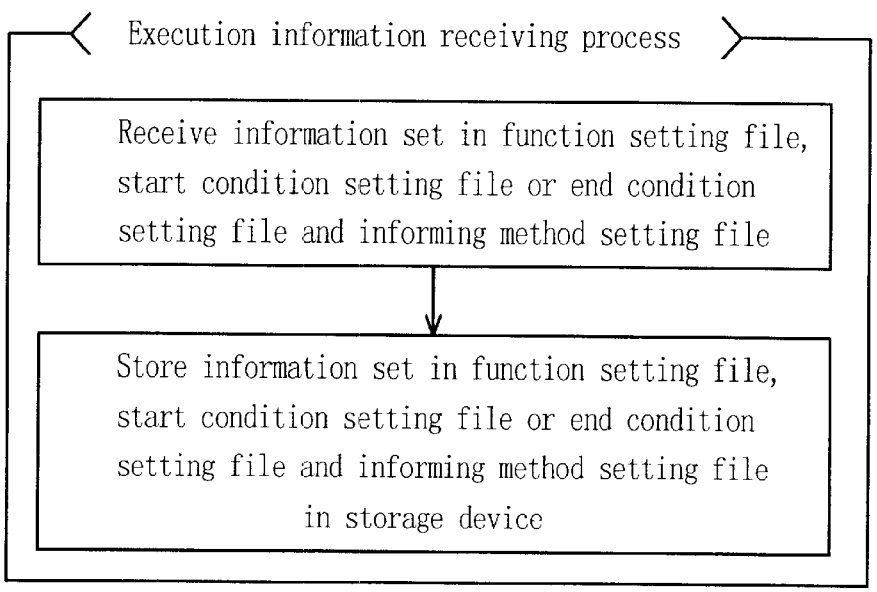

Execution information receiving process
Receive information set in function setting file, start condition setting file or end condition setting file and informing method setting file Store information set in function setting file, start condition setting file or end condition setting file and informing method setting file in storage device

Fig. 15(a)

Informing method setting format

```
Command to be executed : Command 1, SQL 2
Recipient
   Device : TEL, EMAIL
   Address : 7-649-8040, 075-663-1111, matsumoto@krl.mec
Informing level : Urgent
Informing mode : Always
```

Fig. 15(b)

Informing method setting file

```
Command to be executed : Yield accumulation 1
Recipient
   Device : EMAIL
   Address : matsumoto@krl.mec
Informing level : Urgent
Informing mode : Once
```

Fig. 15(c)

Informing method setting file

```
Command to be executed : Priority lot dedicated processing 1,
                        Closing number limit 1
Recipient
   Device : TEL
   Address : 7-649-8040
Informing level : Normal
Informing mode : Once
```

Fig. 17

Load supervisory table

| Start point | End point | Load |
|---|---|---|
| ⋮ | ⋮ | ⋮ |
| Request system | Agent system 1 | 2 |
| Request system | Agent system 4 | 1 |
| Request system | Agent system 6 | 2 3 |
| ⋮ | ⋮ | ⋮ |
| Agent system 1 | Agent system 2 | 3 |
| ⋮ | ⋮ | ⋮ |
| Agent system 2 | Agent system 3 | 1 |
| Agent system 2 | Agent system 5 | 6 |
| ⋮ | ⋮ | ⋮ |
| Agent system 3 | Final agent system | 4 |
| ⋮ | ⋮ | ⋮ |
| Agent system 4 | Agent system 2 | 8 |
| ⋮ | ⋮ | ⋮ |
| Agent system 5 | Final agent system | 3 |
| ⋮ | ⋮ | ⋮ |
| Agent system 6 | Final agent system | 1 2 |
| ⋮ | ⋮ | ⋮ |

Fig. 18

Result return file

```
Place= Factory A
System name= PRINCE
Local command= YIELD1
Execution result= 76 %
Message number=
```

Fig. 19

Result return file

```
Place=Laboratory C
System name= SOLOM
Local command= PTC1
Execution result= 1998/07/20 15:18 Nomal termination
Message number=
```

Fig. 20

Wait message table

| Message device | Address | Message number | Informing level | Informing mode |
|---|---|---|---|---|
| ⋮ | ⋮ | ⋮ | ⋮ | ⋮ |
| E M A I L | tanimura@krl.mec | 1 3 2 | Normal | Once |
| E M A I L | matsumoto@krl.mec | 1 3 4 | Urgent | Once |
| ⋮ | ⋮ | ⋮ | ⋮ | ⋮ |
| ⋮ | ⋮ | ⋮ | ⋮ | ⋮ |
| T E L | 7-649-804 | 1 3 3 | Urgent | Always |
| T E L | 7-649-804 | 1 3 5 | Normal | Once |
| ⋮ | ⋮ | ⋮ | ⋮ | ⋮ |
| ⋮ | ⋮ | ⋮ | ⋮ | ⋮ |

PRODUCTION CONTROL SYSTEM AND METHOD

BACKGROUND OF THE INVENTION

The present invention relates to a system and a method for production control, such as retrieval of production information of products, instruction to processing apparatuses and registration of production plans. More particularly, it relates to production control system and method for controlling information on production of semiconductors by utilizing various information changing with time.

A conventional production control system will now be described with reference to FIGS. 21(a) through 21(c).

The conventional production control system includes plural execution systems for controlling apparatuses installed in a manufacturing plant in accordance with their use purposes. Execution systems generally used are, for example, an information retrieval system 10 (for retrieving production information of products) shown in a block diagram of FIG. 21(a), an apparatus instruction system 20 (for instructing processing apparatuses) shown in a block diagram of FIG. 21(b), a production plan registration system 30 (for registering production plans) shown in a block diagram of FIG. 21(c) and the like.

As is shown in FIGS. 21(a) through 21(c), the information retrieval system 10, the apparatus instruction system 20 and the production plan registration system 30 respectively include function setting means 11, 21 and 31, function executing means 12, 22 and 32, and result informing means 13, 23 and 33.

Now, a method of retrieving production information by using the information retrieval system 10 will be described with reference to FIG. 21(a).

First, the information retrieval system 10 is activated.

Next, a retrieval method is selected by using the function setting means 11 from a table or the like of retrieval methods previously registered in the information retrieval system 10, and execution of the retrieval is instructed by pushing a retrieval start button or the like.

Then, the retrieval is executed by the function executing means 12 by using, for example, an SQL statement or the like in accordance with the retrieval method selected by the function setting means 11.

Subsequently, when the retrieval using an SQL statement or the like is completed and a retrieval result is obtained, the result is output to a printer or the like by the result informing means 13.

Now, a method of instructing a processing apparatus for processing products to suspend the processing by using the apparatus instruction system 20 will be described with reference to FIG. 21(b).

First, the apparatus instruction system 20 is activated.

Next, a processing apparatus to be suspended is selected by the function setting means 21 from a table or the like of processing apparatuses previously registered in the apparatus instruction system 20, and a command for suspending the processing is set by inputting a reason for the suspension from a keyboard. Thereafter, a process suspension menu is selected on a menu panel or the like so as to instruct the suspension of the processing.

Then, the command for suspending the processing set by the function setting means 21 is executed on the processing apparatus by the function executing means 22.

Subsequently, when the execution of the command is completed and an execution result of the command is returned from the processing apparatus, the execution result of the command is output by the result informing means 23 to a dedicated screen, such as a CRT, of the apparatus instruction system 20.

Now, a method of registering a production plan for products by using the production plan registration system 30 will be described with reference to FIG. 21(c).

First, the production plan registration system 30 is activated.

Next, a production plan is set by the function setting means 31 by inputting a process start schedule, a process complete schedule and the like by using a mouse or the like and inputting a recipient and the like of the products by using a bar code or the like.

Then, the production plan set by the function setting means 31 is transmitted by the function executing means 32 to a processing apparatus.

Subsequently, when the transmission of the production plan is completed and a transmission result is returned from the processing apparatus, the transmission result is registered by the result informing means 33 in a table or the like controlled by the production plan registration system 30.

In the retrieval of production information, the instruction to processing apparatuses and the registration of production plans by using the conventional production control system, however, it is necessary to activate an individual execution system in accordance with the use purpose and to input or set information by using user interfaces different between execution systems. Therefore, it is difficult for a user to operate the respective execution systems because the operating methods are respectively different and it is also difficult to understand functions peculiar to the respective execution systems.

Furthermore, the results of the retrieval of production information, the instruction to processing apparatuses and the registration of production plans obtained by the conventional production control system are output to output devices in formats both different between the respective execution systems. Therefore, a user can make a mistake in understanding an output result and in finding an output device for outputting the result.

Accordingly, in use of the conventional production control system, a user is required to be skillful in the complicated operating methods and functions of the respective execution systems.

Moreover, in retrieving the same production information from apparatuses installed in different manufacturing plants by using the conventional production control system, the retrieval should be conducted separately in the execution systems of the respective manufacturing plants. Therefore, it takes a disadvantageously long time for a user to make retrieval, namely, to get desired information.

The conventional production control system further has various problems that information cannot be timely retrieved, that the yield of products is lowered because instruction to a processing apparatus is delayed, and that registration of a production plan is delayed when the operation condition of a processing apparatus is changed (because of settlement of a trouble or the like).

SUMMARY OF THE INVENTION

In consideration of the aforementioned conventional problems, an object of the invention is controlling an apparatus installed in a manufacturing plant without being skillful in the operating method or function of an execution system for controlling the apparatus.

In order to achieve the object, according to the invention, the apparatus installed in the manufacturing plant is controlled by using a request system for setting an executive function to be executed for controlling the apparatus installed in the manufacturing plant through an agent system for instructing the execution system to execute the executive function.

Specifically, the first production control system of this invention for controlling apparatuses installed in manufacturing plants by using execution systems, comprises a request system for setting an executive function to be executed for controlling any of the apparatuses; and an agent system connected with the execution systems and the request system through a computer network, and the request system includes function setting means for setting, in a function setting part, a function name indicating a kind of an executive function to be executed and a manufacturing plant where the executive function is to be executed; execution condition setting means for setting an execution start condition or an execution end condition for the executive function in a start condition setting part or an end condition setting part; and execution information transmitting means for transmitting, to the agent system, the function name and the manufacturing plant set in the function setting part and the execution start condition or the execution end condition set in the start condition setting part or the end condition setting part as execution information, and the agent system includes execution information receiving means for receiving the execution information transmitted from the execution information transmitting means; function controlling means for determining whether or not the execution start condition or the execution end condition included in the execution information received by the execution information receiving means is satisfied, and when the execution start condition or the execution end condition is satisfied, for instructing an execution system working in the manufacturing plant included in the execution information received by the execution information receiving means to start or end execution of the executive function indicated by the function name included in the execution information received by the execution information receiving means, receiving an execution result from the execution system obtained by carrying out the executive function directed to the execution system, and storing the received execution result in a result return part; and result informing means for outputting the execution result stored in the result return part to a message device.

In the first production control system, when a function name indicating the kind of an executive function, a manufacturing plant where the executive function is to be executed and an execution start condition or an execution end condition for the executive function are set in the request system, the agent system instructs an execution system working in the set manufacturing plant to start or end execution of the executive function indicated by the set function name when the set execution start or end condition is satisfied, so that the execution system can start or end the execution of the executive function in accordance with the instruction.

Thus, merely by setting the function name, the manufacturing plant and the execution start condition or the execution end condition in the request system, the execution system working in the set manufacturing plant starts or ends the execution of the executive function indicated by the set function name when the set execution start or end condition is satisfied. Therefore, there is no need to be skillful in the operating method or function of the execution system in order to start or end the executive function. Accordingly, for example, when information retrieval or processing for products is set as the executive function together with plural manufacturing plants in the request system, the information retrieval can be started or the processing for products can be ended simultaneously in the plural manufacturing plants by using a common request format, and hence, time required for the operation can be shortened. Furthermore, for example, when a proceeding state of a lot or the like is set as the execution start condition or the execution end condition together with the information retrieval or the processing for products set as the executive function in the request system, the information retrieval can be started or the processing for products can be ended timely in accordance with the proceeding state of the lot.

Furthermore, in the first production control system, the result informing means outputs the execution result obtained by carrying out the executive function directed to the execution system to the message device. Therefore, various execution results can be output in a common format, and hence, the contents of execution results can be easily understood.

In the first production control system, the function setting means preferably sets the function name indicating the kind of the executive function to be executed and the manufacturing plant where the executive function is to be executed by using a Web browser, an electric mail software or a telephone.

Thus, a function name and a manufacturing plant can be easily set without being skillful in the operating method of the execution system.

In the first production control system, the function name indicating the kind of the executive function set by the function setting means is preferably an execution command recognizable to a computer, an HTTP address or an SQL statement.

Thus, a function name can be easily set without being skillful in the function of the execution system.

In the first production control system, the execution condition setting means preferably sets the execution start condition or the execution end condition for the executive function in the start condition setting part or the end condition setting part by using a Web browser, an electric mail software or a telephone.

Thus, an execution start condition or an execution end condition can be easily set without being skillful in the operating method of the execution system.

In the first production control system, the execution start condition or the execution end condition for the executive function set by the execution condition setting means preferably includes temporary halt or re-start of the executive function or another function.

Thus, an executive function can be started or ended more timely.

The second production control system of this invention for controlling apparatuses installed in manufacturing plants by using execution systems, comprises a request system for setting an executive function to be executed for controlling any of the apparatuses; an agent system connected with the execution systems and the request system through a computer network; and a reply system connected with the agent system through a computer network, and the request system includes function setting means for setting, in a function setting part, a function name indicating a kind of an executive function to be executed and a manufacturing plant where the executive function is to be executed; execution condition setting means for setting an execution start condition or an execution end condition for the executive function in a start condition setting part or an end condition setting part; informing method setting means for setting, in an informing method setting part, a result informing method for outputting, to a message device, an execution result obtained by carrying out the executive function by any of the execution systems; and execution information transmitting means for transmitting, to the agent system, the function name and the manufacturing plant set in the function setting part, the execution start condition or the execution end condition set in the start condition setting part or the end condition setting part, and the result informing method set in the informing method setting part as execution information, and the agent system includes execution information receiving means for receiving the execution information transmitted from the execution information transmitting means; function controlling means for determining whether or not the execution start condition or the execution end condition included in the execution information received by the execution information receiving means is satisfied, and when the execution start condition or the execution end condition is satisfied, for instructing an execution system working in the manufacturing plant included in the execution information received by the execution information receiving means to start or end execution of the executive function indicated by the function name included in the execution information received by the execution information receiving means, receiving an execution result from the execution system obtained by carrying out the executive function directed to the execution system, and storing the received execution result in a result return part; and result transmitting means for transmitting, to the reply system, the execution result stored in the result return part and the result informing method included in the execution information received by the execution information receiving means as execution result information, and the reply system includes result receiving means for receiving the execution result information transmitted from the result transmitting means; and result informing means for outputting, to the message device, the execution result included in the execution result information received by the result receiving means on the basis of the result informing method included in the execution result information received by the result receiving means.

In the second production control system, when a function name indicating the kind of an executive function, a manufacturing plant where the executive function is to be executed and an execution start condition or an execution end condition for the executive function are set in the request system, the agent system instructs an execution system working in the set manufacturing plant to start or end execution of the executive function indicated by the set function name when the set execution start or end condition is satisfied, so that the execution system can start or end the execution of the executive function in accordance with the instruction.

Thus, merely by setting the function name, the manufacturing plant and the execution start condition or the execution end condition in the request system, the execution system working in the set manufacturing plant starts or ends the execution of the executive function indicated by the set function name when the set execution start or end condition is satisfied. Therefore, there is no need to be skillful in the operating method or function of the execution system in order to start or end the executive function. Accordingly, for example, when information retrieval or processing for products is set as the executive function together with plural manufacturing plants in the request system, the information retrieval can be started or the processing for products can be ended simultaneously in the plural manufacturing plants by using a common request format, and hence, time required for the operation can be shortened. Furthermore, for example, when a proceeding state of a lot or the like is set as the execution start condition or the execution end condition together with the information retrieval or the processing for products set as the executive function in the request system, the information retrieval can be started or the processing for products can be ended timely in accordance with the proceeding state of the lot.

Furthermore, in the second production control system, the result informing means outputs the execution result obtained by carrying out the executive function directed to the execution system to the message device. Therefore, various execution results can be output in a common format, and hence, the contents of execution results can be easily understood. In addition, the result informing means outputs the execution result to the message device on the basis of the result informing method set by the informing method setting means. Therefore, when, for example, a recipient (a predetermined message device and its address) is set as the result informing method, the execution result can be definitely output to the predetermined message device, and hence, the execution result can be definitely received.

In the second production control system, the execution information transmitting means preferably transmits the execution information to an agent system corresponding to a final recipient through plural agent systems.

Thus, the execution information can be transmitted to an agent system not directly recognized by the execution information transmitting means.

In the second production control system, the execution information transmitting means preferably transmits the execution information to an agent system corresponding to a final recipient through plural agent systems selected so as to minimize a total load of the agent systems through which the execution information is transmitted.

Thus, the execution information can be efficiently transmitted to an agent system corresponding to a final recipient.

In the second production control system, the execution information transmitting means preferably transmits the execution information to an agent system corresponding to a final recipient through plural agent systems selected so as to make comparatively small a total load of the agent systems through which the execution information is transmitted.

Thus, even when the execution information cannot be transmitted to the agent system corresponding to the final recipient through plural agent systems so as to minimize the total load of the passed agent systems, the execution information can be transmitted to the agent system corresponding to the final recipient so as to make the total load of the passed agent systems the second or third smallest.

In the second production control system, the execution information transmitting means preferably transmits the execution information to an agent system corresponding to a final recipient through plural agent systems selected so as to minimize a number of the agent systems through which the execution information is transmitted.

Thus, the execution information can be easily transmitted to the agent system corresponding to the final recipient.

In the second production control system, the execution information transmitting means preferably transmits the execution information to an agent system corresponding to a final recipient through plural agent systems selected so as to make comparatively small a number of the agent systems through which the execution information is transmitted.

Thus, even when the execution information cannot be transmitted to the agent system corresponding to the final recipient through plural agent systems so as to minimize the number of the passed agent systems, the execution information can be transmitted to the agent system corresponding to the final recipient so as to make the number of the passed agent systems the second or third smallest.

In the second production control system, the informing method setting means preferably sets the result informing method in the informing method setting part by using a Web browser, an electric mail software or a telephone.

Thus, a result informing method can be easily set without being skillful in the operating method of the execution system.

In the second production control system, the result informing method set by the informing method setting means preferably includes an informing level corresponding to a degree of urgency in outputting, to the message device, the execution result obtained by carrying out the executive function by the execution system, and the result informing means preferably outputs the execution result to the message device on the basis of the informing level.

Thus, an execution result with a higher degree of urgency can be priorly output to a message device.

In the second production control system, the result informing method set by the informing method setting means preferably includes an informing mode for indicating whether or not to confirm receipt of the execution result by the message device in outputting the execution result obtained by carrying out the executive function by the execution system, and when the informing mode is set to confirm receipt of the execution result by the message device, the result informing means preferably repeatedly outputs the execution result to the message device until the receipt of the execution result is confirmed by the message device.

Thus, a significant execution result can be definitely output to a message device.

In the second production control system, the result transmitting means preferably transmits the execution result information to the reply system through plural agent systems.

Thus, the execution result information can be transmitted to a reply system not directly recognized by the result transmitting means.

In the second production control system, the result transmitting means preferably transmits the execution result information to the reply system through plural agent systems selected so as to minimize a total load of the agent systems through which the execution result information is transmitted.

Thus, the execution result information can be efficiently transmitted to the reply system.

In the second production control system, the result transmitting means preferably transmits the execution result information to the reply system through plural agent systems selected so as to make comparatively small a total load of the agent systems through which the execution result information is transmitted.

Thus, even when the execution result information cannot be transmitted to the reply system through plural agent systems so as to minimize the total load of the passed agent systems, the execution result information can be transmitted to the reply system so as to make the total load of the passed agent systems the second or third smallest.

In the second production control system, the result transmitting means preferably transmits the execution result information to the reply system through plural agent systems selected so as to minimize a number of the agent systems through which the execution result information is transmitted.

Thus, the execution result information can be easily transmitted to the reply system.

In the second production control system, the result transmitting means preferably transmits the execution result information to the reply system through plural agent systems selected so as to make comparatively small a number of the agent systems through which the execution result information is transmitted.

Thus, even when the execution result information cannot be transmitted to the reply system through plural agent systems so as to minimize the number of the passed agent systems, the execution result information can be transmitted to the reply system so as to make the number of the passed agent systems the second or third smallest.

The first production control method of this invention for controlling apparatuses installed in manufacturing plants by using execution systems, comprises the steps of setting, by using a request system for setting an executive function to be executed for controlling any of the apparatuses, a function name indicating a kind of the executive function, a manufacturing plant where the executive function is to be executed, and an execution start condition or an execution end condition for the executive function; transmitting, by using the request system, the set function name, the set manufacturing plant and the set execution start condition or the set execution end condition as execution information to an agent system connected with the execution systems and the request system through a computer network; and by using the agent system, receiving the execution information transmitted from the request system, determining whether or not the execution start condition or the execution end condition included in the execution information is satisfied, and when the execution start condition or the execution end condition is satisfied, instructing an execution system working in the manufacturing plant included in the execution information to start or end execution of the executive function indicated by the function name included in the execution information, receiving an execution result from the execution system obtained by carrying out the executive function directed to the execution system, and outputting the execution result to a message device.

In the first production control method, when a function name indicating the kind of an executive function, a manufacturing plant where the executive function is to be executed and an execution start condition or an execution end condition for the executive function are set in the request system, the agent system instructs an execution system working in the set manufacturing plant to start or end execution of the executive function indicated by the set function name when the set execution start or end condition is satisfied, so that the execution system can start or end the execution of the executive function in accordance with the instruction.

Thus, merely by setting the function name, the manufacturing plant and the execution start condition or the execution end condition in the request system, the execution system working in the set manufacturing plant starts or ends the execution of the executive function indicated by the set function name when the set execution start or end condition is satisfied. Therefore, there is no need to be skillful in the operating method or function of the execution system in order to start or end the executive function. Accordingly, for example, when information retrieval or processing for products is set as the executive function together with plural manufacturing plants in the request system, the information retrieval can be started or the processing for products can be ended simultaneously in the plural manufacturing plants by using a common request format, and hence, time required for the operation can be shortened. Furthermore, for example, when a proceeding state of a lot or the like is set as the execution start condition or the execution end condition together with the information retrieval or the processing for products set as the executive function in the request system, the information retrieval can be started or the processing for products can be ended timely in accordance with the proceeding state of the lot.

Furthermore, in the first production control method, the agent system outputs the execution result obtained by carrying out the executive function directed to the execution system to the message device. Therefore, various execution results can be output in a common format, and hence, the contents of execution results can be easily understood.

In the first production control method, the function name indicating the kind of the executive function set by the request system is preferably an execution command recognizable to a computer, an HTTP address or an SQL statement.

Thus, a function name can be easily set without being skillful in the function of the execution system.

In the first production control method, the execution start condition or the execution end condition for the executive function set by the request system preferably includes temporary halt or re-start of the executive function or another function.

Thus, an executive function can be started or ended more timely.

The second production control method of this invention for controlling apparatuses installed in manufacturing plants by using execution systems, comprises the steps of setting, by using a request system for setting an executive function to be executed for controlling any of the apparatuses, a function name indicating a kind of the executive function, a manufacturing plant where the executive function is to be executed, an execution start condition or an execution end condition for the executive function, and a result informing method for outputting, to a message device, an execution result obtained by carrying out the executive function by any of the execution systems; transmitting, by using the request system, the set function name, the set manufacturing plant, the set execution start condition or the set execution end condition and the set result informing method as execution information to an agent system connected with the execution systems and the request system through a computer network; by using the agent system, receiving the execution information transmitted from the request system, determining whether or not the execution start condition or the execution end condition included in the execution information is satisfied, and when the execution start condition or the execution end condition is satisfied, instructing an execution system working in the manufacturing plant included in the execution information to start or end execution of the executive function indicated by the function name included in the execution information, receiving an execution result from the execution system obtained by carrying out the executive function directed to the execution system, and transmitting, as execution result information, the execution result and the result informing method included in the execution information to a reply system connected with the agent system through a computer network; and by using the reply system, receiving the execution result information transmitted from the agent system and outputting, to the message device, the execution result included in the execution result information on the basis of the result informing method included in the execution result information.

In the second production control method, when a function name indicating the kind of an executive function, a manufacturing plant where the executive function is to be executed and an execution start condition or an execution end condition for the executive function are set in the request system, the agent system instructs an execution system working in the set manufacturing plant to start or end execution of the executive function indicated by the set function name when the set execution start or end condition is satisfied, so that the execution system can start or end the execution of the executive function in accordance with the instruction.

Thus, merely by setting the function name, the manufacturing plant and the execution start condition or the execution end condition in the request system, the execution system working in the set manufacturing plant starts or ends the execution of the executive function indicated by the set function name when the set execution start or end condition is satisfied. Therefore, there is no need to be skillful in the operating method or function of the execution system in order to start or end the executive function. Accordingly, for example, when information retrieval or processing for products is set as the executive function together with plural manufacturing plants in the request system, the information retrieval can be started or the processing for products can be ended simultaneously in the plural manufacturing plants by using a common request format, and hence, time required for the operation can be shortened. Furthermore, for example, when a proceeding state of a lot or the like is set as the execution start condition or the execution end condition together with the information retrieval or the processing for products set as the executive function in the request system, the information retrieval can be started or the processing for products can be ended timely in accordance with the proceeding state of the lot.

Furthermore, in the second production control method, the reply system outputs the execution result obtained by carrying out the executive function directed to the execution system to the message device. Therefore, various execution results can be output in a common format, and hence, the contents of execution results can be easily understood. In addition, since the reply system outputs the execution result to the message device on the basis of the set result informing method, when, for example, a recipient (a predetermined message device and its address) is set as the result informing method, the execution result can be definitely output to the predetermined message device, and hence, the execution result can be definitely received.

In the second production control method, the result informing method set by the request system preferably includes an informing level corresponding to a degree of urgency in outputting, to the message device, the execution result obtained by carrying out the executive function by the execution system, and the reply system preferably outputs the execution result to the message device on the basis of the informing level.

Thus, an execution result with a higher degree of urgency can be priorly output to a message device.

In the second production control method, the result informing method set by the request system preferably includes an informing mode for indicating whether or not to confirm receipt of the execution result by the message device in outputting the execution result obtained by carrying out the executive function by the execution system, and when the informing mode is set to confirm receipt of the execution result by the message device, the reply system preferably repeatedly outputs the execution result to the message device until the receipt of the execution result is confirmed by the message device.

Thus, a significant execution result can be definitely output to a message device.

In the second production control method, the request system preferably transmits the execution information to an agent system corresponding to a final recipient through plural agent systems.

Thus, the execution information can be transmitted to an agent system not directly recognized by the request system.

In the second production control method, the request system preferably transmits the execution information to an agent system corresponding to a final recipient through plural agent systems selected so as to minimize a total load of the agent systems through which the execution information is transmitted.

Thus, the execution information can be efficiently transmitted to the agent system corresponding to the final recipient.

In the second production control method, the request system preferably transmits the execution information to an agent system corresponding to a final recipient through plural agent systems selected so as to make comparatively small a total load of the agent systems through which the execution information is transmitted.

Thus, even when the execution information cannot be transmitted to the agent system corresponding to the final recipient through plural agent systems so as to minimize the total load of the passed agent systems, the execution information can be transmitted to the agent system corresponding to the final recipient so as to make the total load of the passed agent systems the second or third smallest.

In the second production control method, the request system preferably transmits the execution information to an agent system corresponding to a final recipient through plural agent systems selected so as to minimize a number of the agent systems through which the execution information is transmitted.

Thus, the execution information can be easily transmitted to the agent system corresponding to the final recipient.

In the second production control method, the request system preferably transmits the execution information to an agent system corresponding to a final recipient through plural agent systems selected so as to make comparatively small a number of the agent systems through which the execution information is transmitted.

Thus, even when the execution information cannot be transmitted to the agent system corresponding to the final recipient through plural agent systems so as to minimize the number of the passed agent systems, the execution information can be transmitted to the agent system corresponding to the final recipient so as to make the number of the passed agent systems the second or third smallest.

In the second production control method, the agent system preferably transmits the execution result information to the reply system through plural agent systems.

Thus, the execution result information can be transmitted to a reply system not directly recognized by the agent system.

In the second production control method, the agent system preferably transmits the execution result information to the reply system through plural agent systems selected so as to minimize a total load of the agent systems through which the execution result information is transmitted.

Thus, the execution result information can be efficiently transmitted to the reply system.

In the second production control method, the agent system preferably transmits the execution result information to the reply system through plural agent systems selected so as to make comparatively small a total load of the agent systems through which the execution result information is transmitted.

Thus, even when the execution result information cannot be transmitted to the reply system through plural agent systems so as to minimize the total load of the passed agent systems, the execution result information can be transmitted to the reply system so as to make the total load of the passed agent systems the second or third smallest.

In the second production control method, the agent system preferably transmits the execution result information to the reply system through plural agent systems selected so as to minimize a number of the agent systems through which the execution result information is transmitted.

Thus, the execution result information can be easily transmitted to the reply system.

In the second production control method, the agent system preferably transmits the execution result information to the reply system through plural agent systems selected so as to make comparatively small a number of the agent systems through which the execution result information is transmitted.

Thus, even when the execution result information cannot be transmitted to the reply system through plural agent systems so as to minimize the number of the passed agent systems, the execution result information can be transmitted to the reply system so as to make the number of the passed agent systems the second or third smallest.

BRIEF DESCRIPTION OF THE DRAWINGS

FIG. 5(a) is a diagram of a function setting format used in the production control method of Embodiment 1 or 2 and FIG. 5(b) is a diagram of a function setting file used in the production control method of Embodiment 1 or 2;

FIG. 6(a) is a diagram of a start condition setting format used in the production control method of Embodiment 1 or 2 and FIG. 6(b) is a diagram of a start condition setting file used in the production control method of Embodiment 1 or 2;

FIG. 7(a) is a diagram of an end condition setting format used in the production control method of Embodiment 1 or 2 and FIG. 7(b) is a diagram of an end condition setting file used in the production control method of Embodiment 1 or 2;

FIG. 8. is a diagram of a command conversion table used in the production control method of Embodiment 1 or 2;

FIG. 9 is a diagram of a result return file used in the production control method of Embodiment 1;

FIG. 10 is a diagram of another result return file used in the production control method of Embodiment 1;

FIG. 13(a) is a flowchart for showing procedures in an informing method setting process in the production control method of Embodiment 2, FIG. 13(b) is a flowchart for showing procedures in an execution information transmitting process in the production control method of Embodiment 2 and FIG. 13(c) is a flowchart for showing procedures in an execution information receiving process in the production control method of Embodiment 2;

FIG. 15(a) is a diagram of an informing method setting format used in the production control method of Embodiment 2 and FIGS. 15(b) and 15(c) are diagrams of informing method setting files used in the production control method of Embodiment 2;

FIG. 17 is a diagram of a load supervisory table used in the production control method of Embodiment 2;

FIG. 18 is a diagram of a result return file used in the production control method of Embodiment 2;

FIG. 19 is a diagram of another result return file used in the production control method of Embodiment 2;

FIG. 20 is a diagram of a wait message table used in the production con method of Embodiment 2.

DETAILED DESCRIPTION OF THE INVENTION

Embodiment 1

Now, production control system and method according to Embodiment 1 of the invention will be described with reference to the accompanying drawings.

Figure 1:
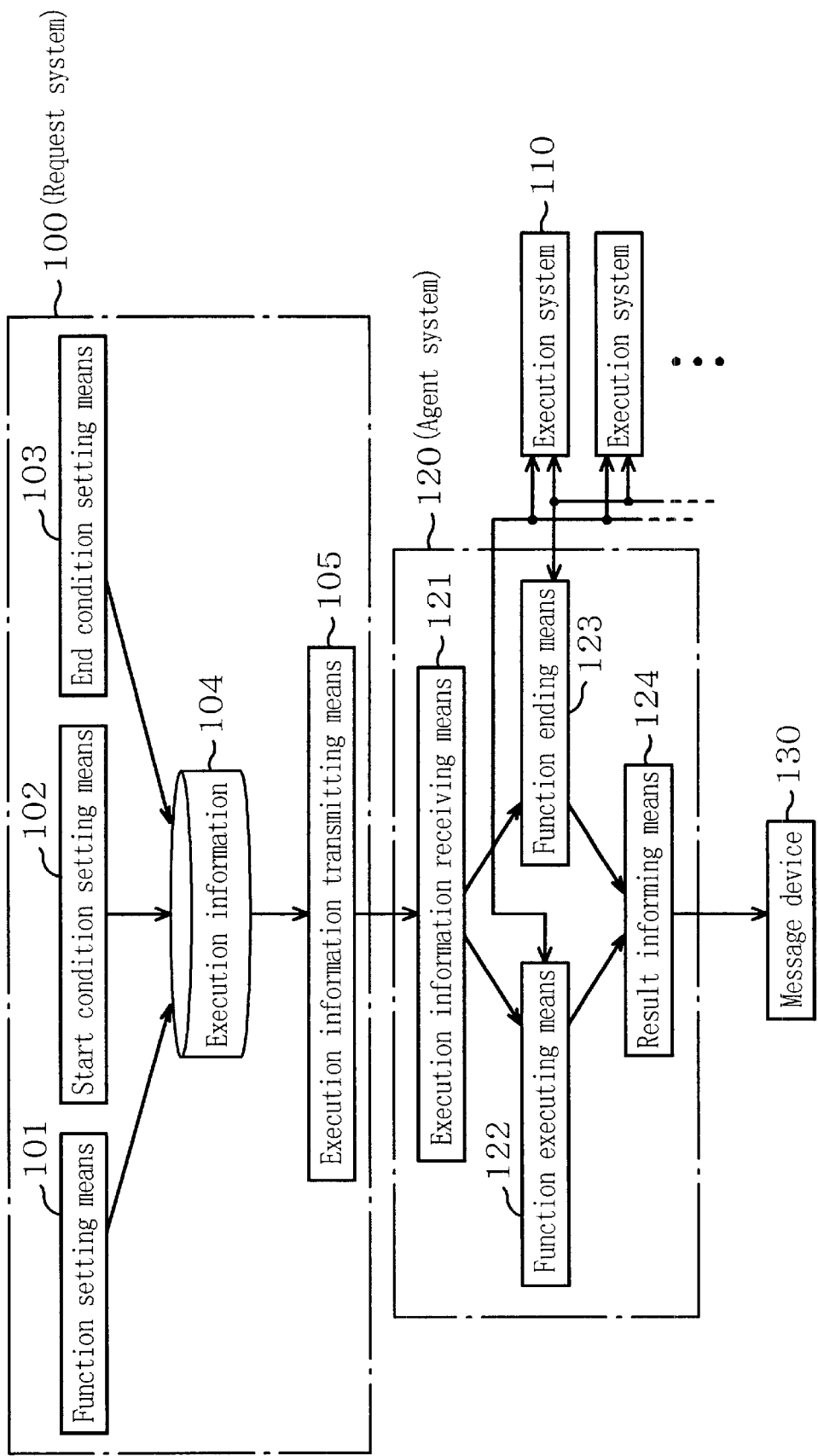
FIG. 1 is a block diagram for showing the structure of a production control system according to Embodiment 1 of the invention.

FIG. 1 is a block diagram for showing the structure of the production control system of Embodiment 1.

As is shown in FIG. 1, the production control system of this embodiment includes a request system 100 for setting executive functions to be executed for controlling apparatuses installed in manufacturing plants, and an agent system 120 for instructing execution systems 110 for controlling the apparatuses installed in the manufacturing plants to execute the executive functions. The agent system 120 is connected with the request system 100 or the execution systems 110 through a computer network.

The request system 100 includes a function setting means 101 for setting, in a file or the like, a function name indicating the kind of an executive function to be executed and a manufacturing plant where the executive function is to be executed; start condition setting means 102 for setting, in a file or the like, an execution start condition for the executive function; end condition setting means 103 for setting, in a file or the like, an execution end condition for the executive function; and execution information transmitting means 105 for transmitting the function name, the manufacturing plant and the execution start condition or the execution end condition set in the files or the like to the agent system 120 as execution information 104.

The agent system 120 includes execution information receiving means 121, function executing means 122, function ending means 123 and result informing means 124 respectively operated as follows: The execution information receiving means 121 receives the execution information 104 transmitted from the execution information transmitting means 105. The function executing means 122 determines whether or not the execution start condition included in the execution information 104 is satisfied, and when the execution start condition is satisfied, it instructs any of the execution systems 110 working in the manufacturing plant included in the execution information 104 to start execution of the executive function indicated by the function name included in the execution information 104. Furthermore, the function executing means 122 receives an execution result from the execution system 110 obtained by carrying out the executive function directed to the execution system 110, and stores the received execution result in a file or the like. The function ending means 123 determines whether or not the execution end condition included in the execution information 104 is satisfied, and when the execution end condition is satisfied, it instructs any of the execution systems 110 working in the manufacturing plant included in the execution information 104 to end execution of the executive function indicated by the function name included in the execution information 104. Furthermore, the function ending means 123 receives an execution result from the execution system 110 obtained by carrying out the executive function directed to the execution system 110 and stores the received execution result in a file or the like. The result informing means 124 outputs the execution result stored in the file or the like to a message device 130.

Figure 2:
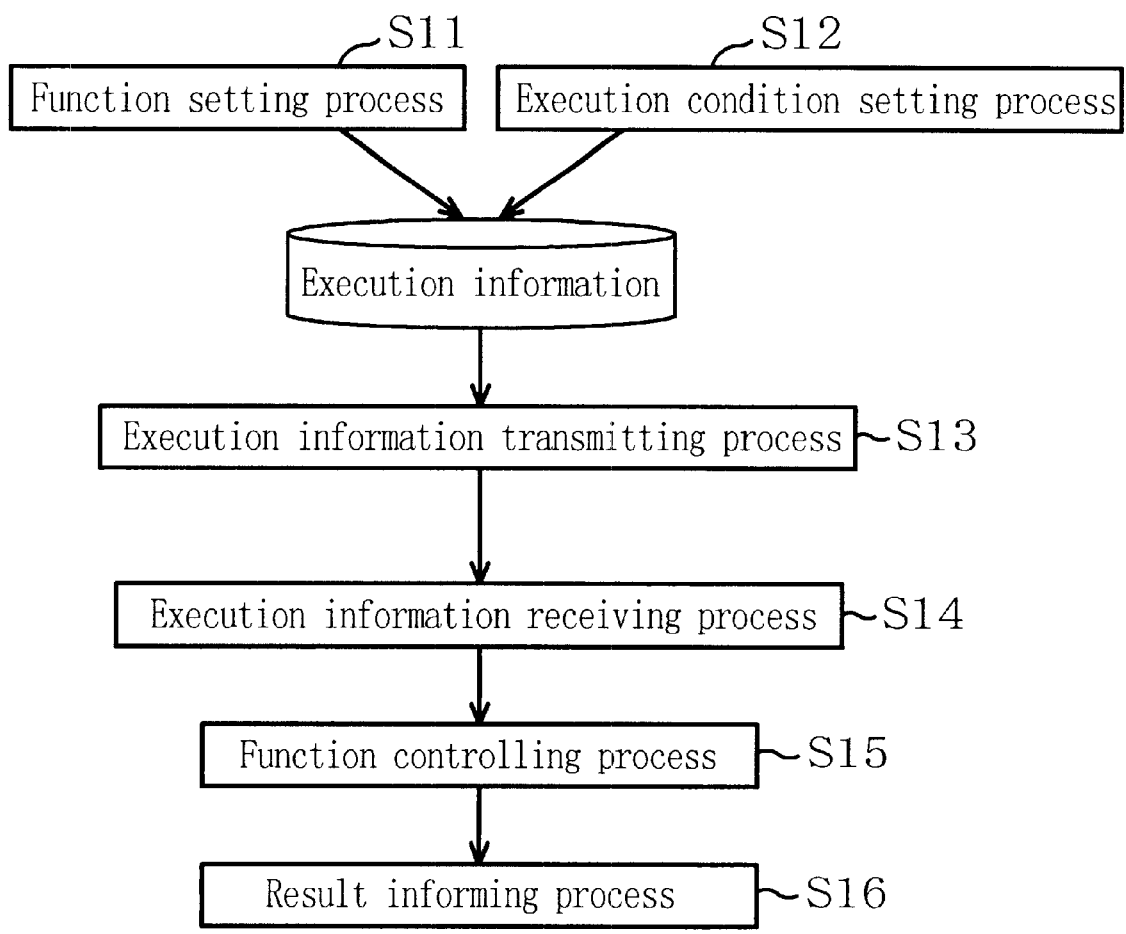
FIG. 2 is a flowchart for showing a production control method of Embodiment 1.

Now, the production control method conducted by the production control system of this embodiment will be described with reference to FIGS. 2, 3(*a*) through 3(*d*), 4(*a*) and 4(*b*) by exemplifying a case of accumulating yield information of LSIs and ending a dedicated processing for a higher priority lot when the processing of the higher priority lot with high urgency is completed in plural LSI manufacturing plants. FIG. 2 is a flowchart for showing entire processes in the production control method of this embodiment, and FIGS. 3(*a*) through 3(*d*), 4(*a*) and 4(*b*) are flowcharts for showing procedures in the respective processes in the production control method of this embodiment.

[Function Setting Process S11]

As is shown in the flowchart for a function setting process of FIG. 3(*a*), the function setting means 101 sets a function name indicating the kind of an executive function to be executed (namely, the accumulation of the yield information of LSIs in this embodiment) in a storage device controlled by a computer, for example, in a function execution part of a function setting file shown in FIG. 5(*b*) in accordance with a function setting format shown in FIG. 5(*a*). Also, the function setting means 101 sets another function name indicating the kind of an executive function to be ended (namely, the dedicated processing for the higher priority lot in this embodiment) in a function end part of the function setting file of FIG. 5(*b*).

In each of the function execution part and the function end part of the function setting format shown in FIG. 5(*a*), a plurality of the following three kinds of commands or a combination of different kinds of commands can be set as a function name indicating the kind of an executive function:

(1) An execution command recognizable to a computer (the kind of the execution command not specified as far as it is executable by an OS (operating system))

(2) A command for operating a data base (such as SQL commands, and the kind of the command for operating a data base not specified)

(3) An HTTP address (an addressing method not specified as far as the address is a format recognizable to WWW (world wide web))

Furthermore, in the function setting format, an execution place corresponding to a manufacturing plant where the executive function is to be executed can be set, and the set execution place can be plural in number, whereas each manufacturing plant is generally provided with plural execution systems.

Moreover, in the function setting format, plural combinations of a command and an execution place can be set, and execution of different commands can be started or ended in different execution places.

The contents set in the function execution part of the function setting file of FIG. 5(*b*) mean that execution of a command "yield accumulation 1" is to be started in factories A, E and F, and the contents set in the function end part of the function setting file of FIG. 5(*b*) mean that execution of a command "priority lot dedicated processing 1" is to be ended in a laboratory C.

[Execution Condition Setting Process S12]

As is shown in the flowchart for a start condition setting process in an execution condition setting process of FIG. 3(*b*), the start condition setting means 102 sets an execution start condition (a condition for starting the accumulation of the LSI yield information in this embodiment) in a storage device controlled by a computer, for example, in a start condition setting file of FIG. 6(*b*) in accordance with a start condition setting format of FIG. 6(*a*).

In the start condition setting format shown in FIG. 6(*a*), any of the following six conditions can be set:

(1) An execution state of a specified function (such as START, END, STOP, RE-START and RUNNING)

(2) A state of the lot (such as WAIT, PROCESS, STOP and END)

(3) A state of the apparatus (such as PROCESS, IDLE, DOWN, MAINTENANCE, GO-ON and GO-DOWN)

(4) An execution start time for the executive function (which is directly specified as YY:MM:DD:HH:MM:SS)

(5) An execution start time for the executive function (which is indirectly specified as MM minutes after or MM minutes before)

(6) A number of the start condition setting file

In the start condition setting format, a combination of the aforementioned conditions is used, and hence, a condition for combining these conditions (1) through (6) can be set as the seventh condition.

The contents set in the start condition setting file of FIG. 6(*b*) mean that the execution of the executive function is to be started after completing the processing for the higher priority lot.

Furthermore, as is shown in the flowchart for an end condition setting process in the execution condition setting process of FIG. 3(*b*), the end condition setting means 103 sets an execution end condition (namely, a condition for ending the dedicated processing for the higher priority lot in this embodiment) in a storage device controlled by a computer, for example, in an end condition setting file of FIG. 7(*b*) in accordance with an end condition setting format of FIG. 7(*a*).

In the end condition setting format of FIG. 7(*a*), any of the following seven conditions can be set:

(1) An execution state of a specified function (such as START, END, STOP, RE-START and RUNNING)

(2) A state of the lot (such as WAIT, PROCESS, STOP and END)

(3) A state of the apparatus (such as PROCESS, IDLE, DOWN, MAINTENANCE, GO-ON and GO-DOWN)

(4) An execution end time for the executive function (which is directly specified as YY:MM:DD:HH:MM:SS)

(5) An execution end time for the executive function (which is indirectly specified as MM minutes after or MM minutes before)

(6) A name of the execution system to be ended (7) A number of the end condition setting file In the end condition setting format, a combination of the aforementioned conditions is used, and hence, a condition for combining these conditions (1) through (7) can be set as the eighth condition.

The contents set in the end condition setting file of FIG. 7(*b*) mean that the execution of the executive function is to be ended immediately after completing the processing for the higher priority lot.

In order to set information in the function setting file, the start condition setting file or the end condition setting file, the following three types of user interfaces are mainly used:

(1) To input information after connecting a Web browser operable on a computer to a specific address (the Web browser can be connected to the specific address after inputting information in the Web browser).

(2) To send an electric mail to a specific address after setting information in an electric mail text by using an electric mail tool.

(3) To set information by converting input voice into characters by using a speech synthesizing tool using a telephone or the like.

For setting the information in the function setting file, the start condition setting file or the end condition setting file, an existing editor or file information setting application software can be used in stead of the aforementioned user interfaces.

Furthermore, the function setting file can be replaced with a table or a list structure in accordance with the function setting format.

Also, the start condition setting file can be replaced with a table or a list structure in accordance with the start condition setting format.

Additionally, the end condition setting file can be replaced with a table or a list structure in accordance with the end condition setting format.

[Execution Information Transmitting Process S13]

Figure 3A:
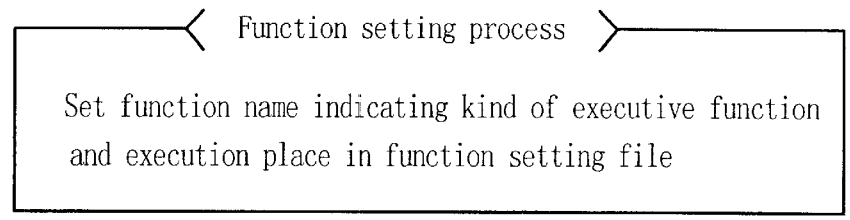
FIG. 3(a) is a flowchart for showing procedures in a function setting process in the production control method of Embodiment 1.
Figure 3B:
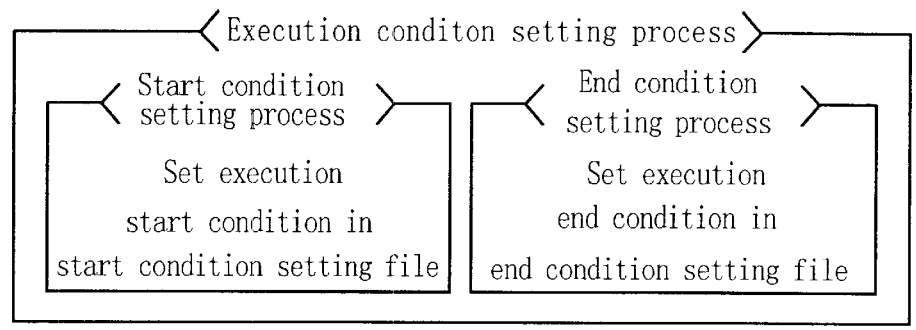
FIG. 3(b) is a flowchart for showing procedures in an execution condition setting process in the production control method of Embodiment 1.
Figure 3C:
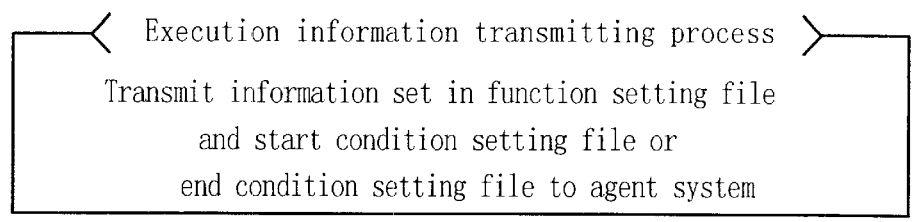
FIG. 3(c) is a flowchart for showing procedures in an execution information transmitting process in the production control method of Embodiment 1.

As is shown in the flowchart for an execution information transmitting process of FIG. 3(c), the execution information transmitting means 105 transmits, to the agent system 120, the command and the execution place set in the function setting file and the execution start condition or the execution end condition set in the start condition setting file or the end condition setting file as the execution information 104.

In the execution information transmitting means 105, file copy using a protocol such as RCP and FTP or file attachment to an electric mail can be adopted as the method of transmitting the execution information 104, namely, the function setting file and the start condition setting file or the end condition setting file, to the agent system 120.

Alternatively, in the execution information transmitting means 105, the execution information 104 can be transmitted by using socket communication in which one file is divided into plural data to be reconstructed into one file at a recipient instead of the aforementioned transmitting methods.

[Execution Information Receiving Process S14]

Figure 3D:
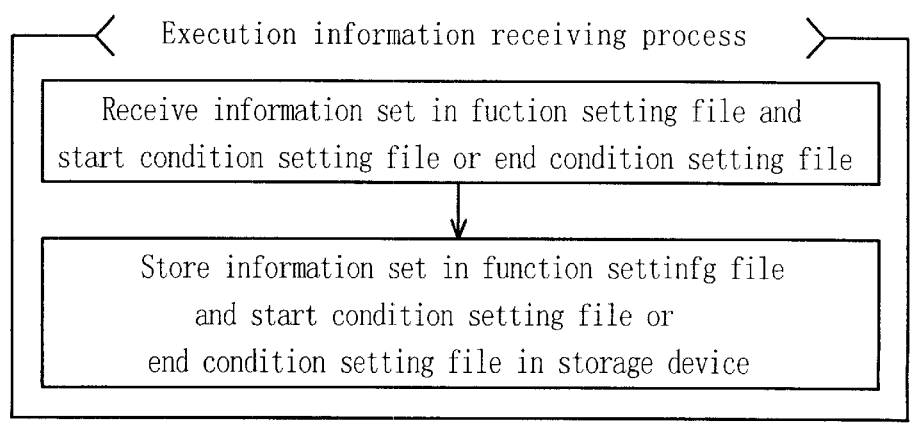
FIG. 3(d) is a flowchart for showing procedures in an execution information receiving process in the production control method of Embodiment 1.

As is shown in the flowchart for an execution information receiving process of FIG. 3(d), the execution information receiving means 121 receives the execution information 104 transmitted from the execution information transmitting means 105 and stores the function setting file and the start condition setting file or the end condition setting file in a storage device controlled by a computer.

[Function Controlling Process S15]

As is shown in the flowchart for a function executing process in a function controlling process of FIG. 4(a), the function executing means 122 extracts the command and the execution place from the function execution part of the function setting file and the execution start condition from the start condition setting file. Then, by using the extracted command and execution place as keys, the function executing means 122 extracts a local command, a system name and an inquiry method from a command conversion table shown in FIG. 8 repeatedly in the number of times corresponding to the number of extracted commands and execution places.

A local command means a peculiar command for specifying an executive function used in each execution system alone, a system name means the name of an execution system where the command is to be executed, and an inquiry method means a method of inquiring the execution system of information.

The command conversion table shown in FIG. 8 is a table including, as its items, execution places, commands, local commands, system names and inquiry methods used in a storage device controlled by a computer. These information are previously registered in the command conversion table by using a data base operating language such as SQL.

Next, the function executing means 122 periodically checks whether or not the execution system 110 having the extracted system name satisfies the extracted execution start condition by using the extracted inquiry method. When the execution system 110 satisfies the execution start condition, the function executing means 122 instructs the execution system 110 to start execution of the extracted local command, receives an execution result from the execution system 110 obtained by carrying out the local command directed to the execution system 110, and stores the received execution result in a result return file shown in FIG. 9 in a storage device controlled by a computer. The instruction to start execution of the local command and the storage of the execution result in the result return file are conducted repeatedly in the number of times corresponding to the number of extracted local commands.

The contents stored in the result return file of FIG. 9 mean that the execution result of a local command "YIELD1" (corresponding to the accumulation of the yield information of LSIs) is 76% in an execution system "PRINCE" of the factory A.

Furthermore, as is shown in the flowchart for a function ending process in the function controlling process of FIG. 4(a), the function ending means 123 extracts the command and the execution place from the function end part of the function setting file and the execution end condition from the end condition setting file. Then, by using the extracted command and execution place as keys, the function ending means 123 extracts a local command, a system name and an inquiry method from the command conversion table of FIG. 8 repeatedly in the number of times corresponding to the number of extracted commands and execution places.

Next, the function ending means 123 periodically checks whether or not the execution system 110 having the extracted system name satisfies the extracted execution end condition by using the extracted inquiry method. When the execution system 110 satisfies the execution end condition, the function ending means 123 instructs the execution system 110 to end the execution of the extracted local command, receives an execution result from the execution system 110 obtained by carrying out the local command directed to the execution system 110, and stores the received execution result in a result return file of FIG. 10 in a storage device controlled by a computer. The instruction to end the execution of the local command and the storage of the execution result in the result return file are conducted repeatedly in the number of times corresponding to the number of extracted local commands.

The contents stored in the result return file of FIG. 10 mean that the execution result of a local command "PTC1" (corresponding to the dedicated processing for the higher priority lot) is normal termination in an execution system "SOLOM" of the laboratory C.

The command conversion table of FIG. 8 can be replaced with a file or a list structure having the same contents, and the result return file can be replaced with a table or a list structure having the same contents.

In this embodiment, the function executing means 122 or the function ending means 123 periodically checks whether or not the execution system 110 satisfies the execution start condition or the execution end condition. Instead, the execution system 110 can inform the function executing means 122 or the function ending means 123 that it satisfies the execution start condition or the execution end condition.

[Result Informing Process S16]

Figure 4:
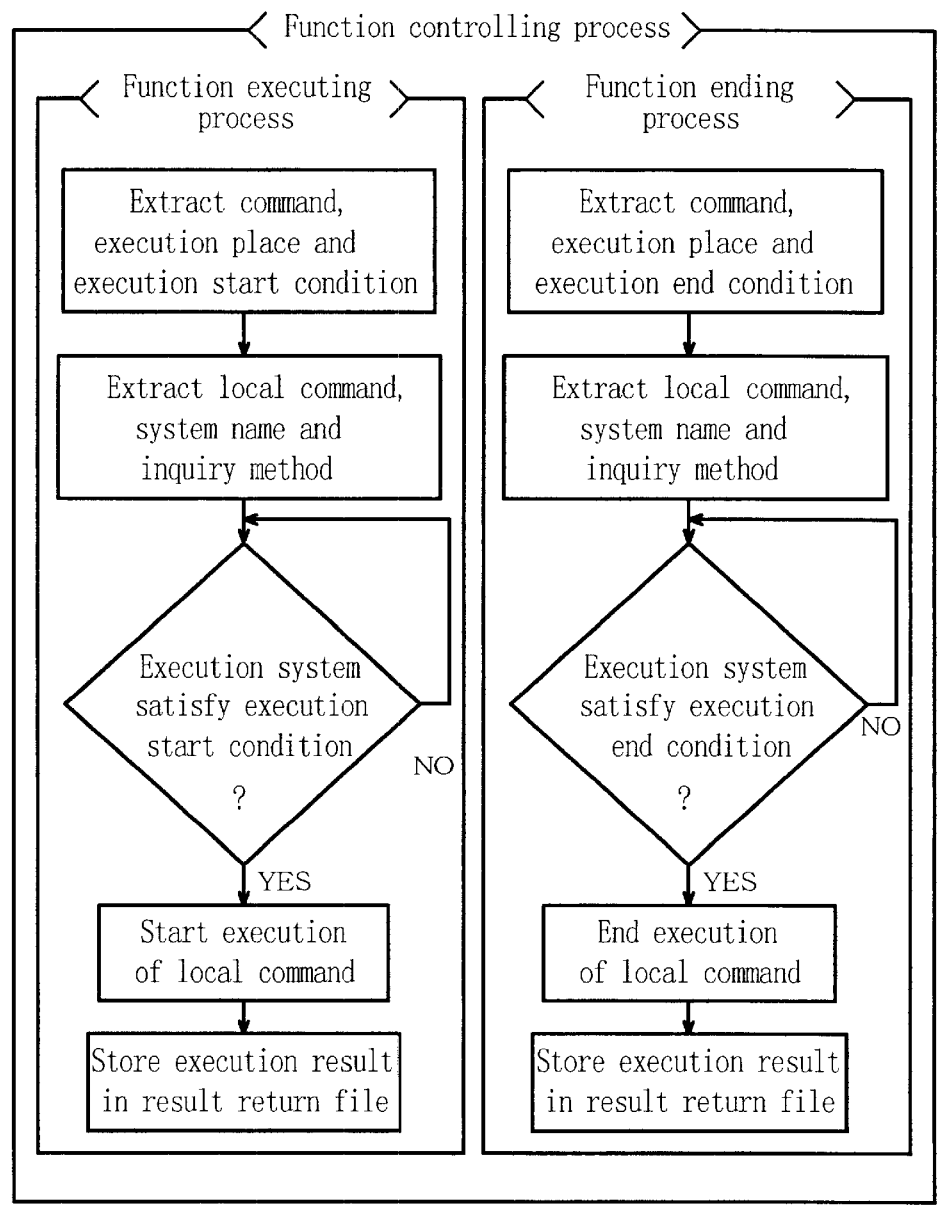
FIG. 4(a) is a flowchart for showing procedures in a function controlling process in the production control method of Embodiment 1 and FIG. 4(b) is a flowchart for showing procedures in a result informing process in the production control method of Embodiment 1.
Figure 4:
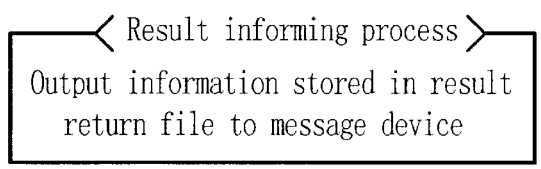

As is shown in the flowchart for a result informing process of FIG. 4(*b*), the result informing means 124 outputs the execution result stored in the result return file to the message device 130.

As the message device 130, an electric mail, a large display panel, a facsimile, a personal computer or a telephone can be used.

Furthermore, in the result informing means 124, a transmitting tool provided to the message device 130 can be used for transmitting the execution result to the message device 130.

According to Embodiment 1, a function name indicating the kind of an executive function, a manufacturing plant where the executive function is to be executed, and an execution start condition or an execution end condition for the executive function are set in the request system 100. Then, the agent system 120 instructs the execution system 110 working in the set manufacturing plant to start or end the execution of the executive function indicated by the set function name when the set execution start or end condition is satisfied, so that the execution system 110 can start or end the execution of the executive function in accordance with the instruction.

Thus, merely by setting the function name, the manufacturing plant and the execution start condition or the execution end condition in the request system 100, the execution system 110 working in the set manufacturing plant starts or ends the execution of the executive function indicated by the set function name when the set execution start or end condition is satisfied. Therefore, there is no need to be skillful in the operating method or function of the execution system 110 in order to start or end the executive function. Accordingly, for example, when information retrieval or processing for products is set as the executive function together with plural manufacturing plants in the request system 100, the information retrieval can be started or the processing for products can be ended simultaneously in the plural manufacturing plants by using a common request format, and hence, time required for the operation can be shortened. Furthermore, for example, when a proceeding state of a lot or the like is set as the execution start condition or the execution end condition together with the information retrieval or the processing for products set as the executive function in the request system 100, the information retrieval can be started or the processing for products can be ended timely in accordance with the proceeding state of the lot.

Moreover, according to Embodiment 1, the result informing means 124 outputs, to the message device 130, an execution result obtained by carrying out an executive function directed to the execution system 110. Accordingly, various execution results can be output in a common format, and hence, the contents of execution results can be easily understood.

Additionally, the function setting means 101 sets a function name indicating the kind of an executive function and a manufacturing plant where the executive function is to be executed by using a Web browser, an electric mail software or a telephone in Embodiment 1. Therefore, there is no need to be skillful in the operating method of the execution system 110 in order to set a function name or a manufacturing plant.

Furthermore, according to Embodiment 1, the start condition setting means 102 sets an execution start condition for an executive function by using a Web browser, an electric mail software or a telephone in Embodiment 1. Therefore, there is no need to be skillful in the operating method of the execution system 110 in order to set an execution start condition.

Moreover, the end condition setting means 103 sets an execution end condition for an executive function by using a Web browser, an electric mail software or a telephone in Embodiment 1. Therefore, there is no need to be skillful in the operating method of the execution system 110 in order to set an execution end condition.

In addition, a function name indicating the kind of an executive function set by the function setting means 101 is an execution command recognizable to a computer, an HTTP address or an SQL statement in Embodiment 1. Therefore, there is no need to be skillful in the operating method of the execution system 110 in order to set a function name.

Furthermore, an execution start condition for an executive function set by the start condition setting means 102 includes temporary halt or re-start of a specific function (the executive function or another function) in Embodiment 1. Therefore, an executive function can be more timely started.

Moreover, an execution end condition for an executive function set by the end condition setting means 103 includes temporary halt or re-start of a specific function in Embodiment 1. Therefore, an executive function can be more timely ended.

In Embodiment 1, the request system 100 includes the start condition setting means 102 (for setting an execution start condition for an executive function in a file or the like) and the end condition setting means 103 (for setting an execution end condition for an executive function in a file or the like). Instead, the request system 100 can include execution condition setting means for setting an execution start condition or an execution end condition for an executive function in a file or the like.

Furthermore, in Embodiment 1, the agent system 120 includes the function executing means 122 (for determining whether or not an execution start condition included in the execution information 104 is satisfied, and when it is satisfied, for instructing any of the execution systems 110 working in a manufacturing plant included in the execution information 104 to start execution of an executive function indicated by a function name included in the execution information 104, receiving an execution result from the execution system 110 obtained by carrying out the executive function directed to the execution system 110 and storing the received execution result in a file or the like); and the function ending means 123 (for determining whether or not an execution end condition included in the execution information 104 is satisfied, and when it is satisfied, for instructing any of the execution systems 110 working in a manufacturing plant included in the execution information 104 to end execution of an executive function indicated by a function name included in the execution information 104, receiving an execution result from the execution system 110 obtained by carrying out the executive function directed to the execution system 110 and storing the received execution result in a file or the like). Instead, the agent system 120 can include function controlling means for determining whether or not an execution start condition or an execution end condition included in the execution information 104 is satisfied, and when it is satisfied, for instructing any of the execution systems 110 working in a manufacturing plant included in the execution information 104 to start or end execution of an executive function indicated by a function name included in the execution information 104, receiving an execution result from the execution system 110 obtained by carrying out the executive function directed to the execution system 110 and storing the received execution result in a file or the like.

When a production control program for realizing the production control method of this embodiment described above is programmed to be recorded in a computer-readable recording medium, the production control program of this embodiment can be loaded in a main storage of a computer by merely mounting the recording medium in an auxiliary storage. Thus, procedures of a desired function can be executed by a CPU of the computer at a predetermined operation timing (event).

Embodiment 2

Now, production control system and method according to Embodiment 2 of the invention will be described with reference to the accompanying drawings.

Figure 11:
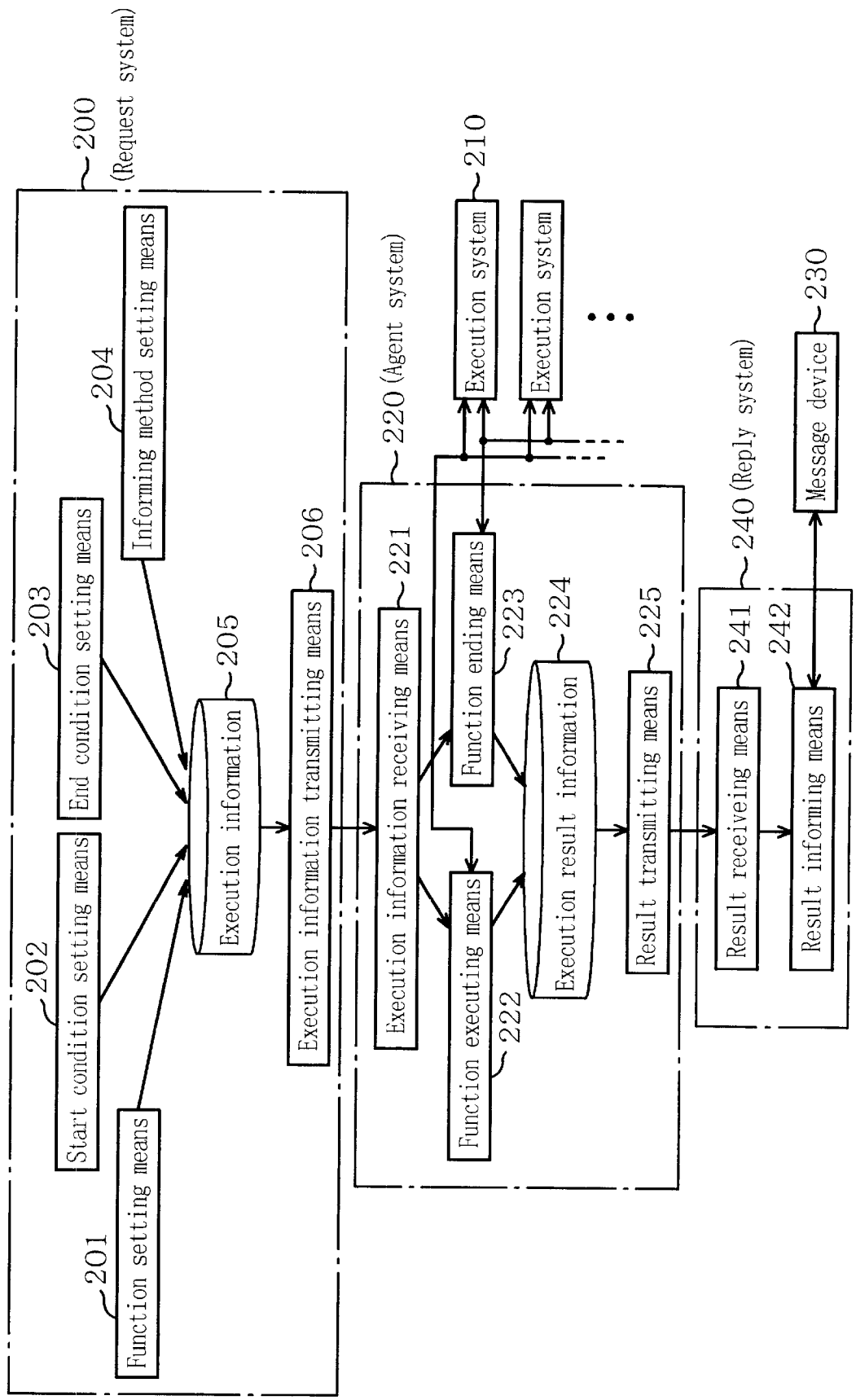
FIG. 11 is a block diagram for showing the structure of a production control system according to Embodiment 2 of the invention.

FIG. 11 is a block diagram for showing the structure of the production control system of Embodiment 2.

As is shown in FIG. 11, the production control system of this embodiment includes a request system 200 for setting executive functions to be executed for controlling apparatuses installed in manufacturing plants; an agent system 220 for instructing execution systems 210 for controlling the apparatuses installed in the manufacturing plants to execute the executive functions; and a reply system 240 for outputting execution results obtained by carrying out the executive functions directed to the execution systems 210 to a message device 230 for informing the execution results. The agent system 220 is connected with the request system 200 or the execution systems 210 through a computer network, and the agent system 220 is also connected with the reply system 240 through a computer network.

The request system 200 includes function setting means 201 for setting a function name indicating the kind of an executive function and a manufacturing plant where the executive function is to be executed in a file or the like; start condition setting means 202 for setting an execution start condition for the executive function in a file or the like; end condition setting means 203 for setting an execution end condition for the executive function in a file or the like; informing method setting means 204 for setting, in a file or the like, a result informing method for outputting an execution result obtained by carrying out the executive function by the execution system 210 to the message device 230; and execution information transmitting means 206 for transmitting, to the agent system 220, the function name, the manufacturing plant, the execution start condition or the execution end condition and the result informing method set in the files or the like as execution information 205.

The agent system 220 includes execution information receiving means 221, function executing means 222, function ending means 223 and result transmitting means 225 respectively operated as follows: The execution information receiving means 221 receives the execution information 205 transmitted from the execution information transmitting means 206. The function executing means 222 determines whether or not the execution start condition included in the execution information 205 is satisfied. When the execution start condition is satisfied, the function executing means 222 instructs any of the execution systems 210 working in the manufacturing plant included in the execution information 205 to start execution of the executive function indicated by the function name included in the execution information 205, receives an execution result from the execution system 210 obtained by carrying out the executive function directed to the execution system 210 and stores the received execution result in a file or the like. The function ending means 223 determines whether or not the execution end condition included in the execution information 205 is satisfied. When the execution end condition is satisfied, the function ending means 223 instructs any of the execution systems 210 working in the manufacturing plant included in the execution information 205 to end the executive function indicated by the function name included in the execution information 205, receives an execution result from the execution system 210 obtained by carrying out the executive function directed to the execution system 210 and stores the received execution result in a file or the like. The result transmitting means 225 transmits the execution result stored in the file or the like and the result informing method included in the execution information 205 to the reply system 240 as execution result information 224.

The reply system 240 includes result receiving means 241 for receiving the execution result information 224 transmitted from the result transmitting means 225 and result informing means 242 for outputting the execution result included in the execution result information 224 to the message device 230 on the basis of the result informing method included in the execution result information 224.

Figure 12:
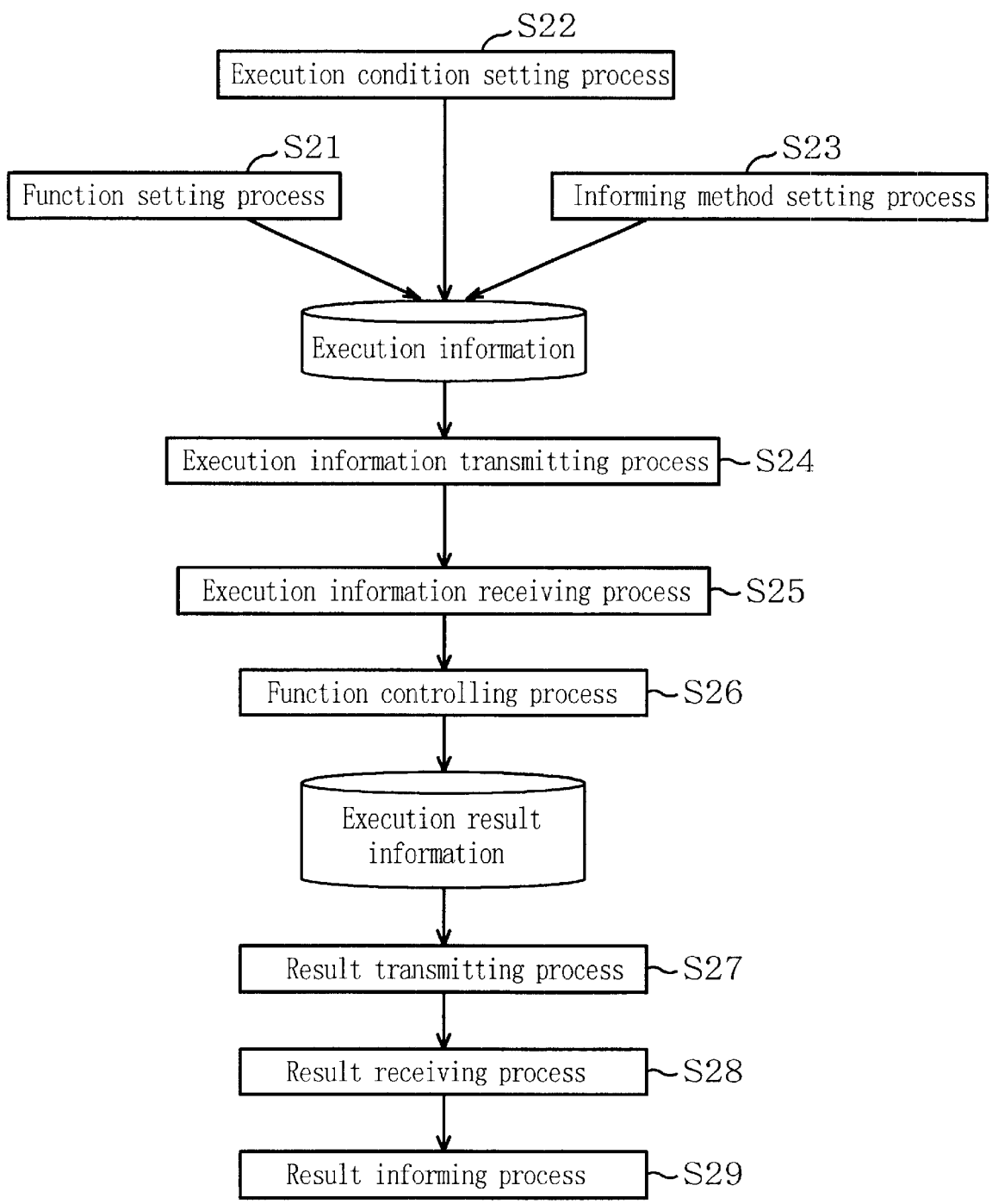
FIG. 12 is a flowchart for showing a production control method of Embodiment 2.

Now, the production control method conducted by the production control system of this embodiment will be described with reference to FIGS. 12, 13(*a*) through 13(*c*), 14(*a*) through 14(*c*) by exemplifying a case of accumulating yield information of LSIs and ending a dedicated processing for a higher priority lot when the processing of the higher priority lot with high urgency is completed in plural LSI manufacturing plants. FIG. 12 is a flowchart for showing entire processes in the production control method of this embodiment, and FIGS. 13(*a*) through 13(*c*) and 14(*a*) through 14(*c*) are flowcharts for showing procedures in the respective processes in the production control method of this embodiment.

[Function Setting Process S21]

Similarly to Embodiment 1, as is shown in the flowchart for a function setting process of FIG. 3(*a*), the function setting means 201 sets a function name indicating the kind of an executive function to be executed (namely, the accumulation of the yield information of LSIs in this embodiment) in a storage device controlled by a computer, for example, similarly to Embodiment 1, in a function execution part of a function setting file shown in FIG. 5(*b*) in accordance with a function setting format shown in FIG. 5(*a*). Also, the function setting means 201 sets another function name indicating the kind of an executive function to be ended (namely, the dedicated processing for the higher priority lot in this embodiment) in a function end part of the function setting file of FIG. 5(*b*).

[Execution Condition Setting Process S22]

Similarly to Embodiment 1, as is shown in the flowchart for a start condition setting process in an execution condition setting process of FIG. 3(*b*), the start condition setting means 202 sets an execution start condition (a condition for starting the accumulation of the LSI yield information in this embodiment) in a storage device controlled by a computer, for example, similarly to Embodiment 1, in a start condition setting file of FIG. 6(*b*) in accordance with a start condition setting format of FIG. 6(*a*).

Furthermore, similarly to Embodiment 1, as is shown in the flowchart for an end condition setting process in the execution condition setting process of FIG. 3(*b*), the end condition setting means 203 sets an execution end condition (namely, a condition for ending the dedicated processing for the higher priority lot in this embodiment) in a storage device controlled by a computer, for example, similarly to Embodiment 1, in an end condition setting file of FIG. 7(b) in accordance with an end condition setting format of FIG. 7(a).

[Informing Method Setting Process S23]

As is shown in the flowchart for an informing method setting process of FIG. 13(a), the informing method setting means 204 sets a result informing method for the command "yield accumulation 1" in a storage device controlled by a computer, for example, in an informing method setting file as is shown in FIG. 15(b) in accordance with an informing method setting format as is shown in FIG. 15(a). The informing method setting means 204 also sets a result informing method for the command "priority lot dedicated processing 1" in an informing method setting file as is shown in FIG. 15(c).

In the informing method setting format of FIG. 15(a), the following four conditions can be set:

(1) A command to be executed, which is set by the function setting means 201 as a function name indicating the kind of an executive function and can be plural in number.

(2) A recipient of the execution result, which corresponds to a message device and its address, plural message devices can be set, and plural addresses can be set with respect to one message device. Message devices that can be set are a telephone (TEL), an electric mail (EMAIL), a facsimile (FAX), a personal computer (PC), a large display panel (PANEL), a fluorescent sign board (SIGN), a television (TV), a video tape recorder (VTR), a Web page (WEB) and the like. Furthermore, the addresses of these message devices can be set as follows: A telephone number is set when a telephone is used; an electric mail address is set when an electric mail is used; a telephone number or an ID number is set when a facsimile is used; a computer address, a computer name or an ID number is set when a personal computer is used; a telephone number, a computer address, a computer name or an ID number is set when a large display panel is used; a telephone number, a computer address, a computer name or an ID number is set when a fluorescent sign board is used; a channel number, a computer address, a computer name or an ID number is set when a television is used; a channel number, a computer address, a computer name or an ID number is set when a video tape recorder is used; and an HTTP address, a computer address, a computer name or an ID number is set when a Web page is used.

(3) An informing level, which corresponds to priority in outputting an execution result to a message device. For example, two informing levels of "urgent" and "normal" can be set. An execution result provided with the "urgent" informing level is output to a message device priorly to an execution result provided with the "normal" informing level.

(4) An informing mode, which corresponds to a mode of outputting an execution result to a message device. For example, two informing modes of "always" and "once" can be set. An execution result provided with the "always" informing mode is repeatedly output to a message device, that is, a recipient of the execution result, until the receipt of the execution result is confirmed. An execution result provided with the "once" informing mode is output merely once to a message device, that is, a recipient of the execution result, regardless of whether or not the receipt is confirmed. In addition to these two informing modes, other informing modes such as "twice" and "three times" can be adopted, so as to output an execution result to a message device plural times.

The contents set in the informing method setting file of FIG. 15(b) mean that the execution result of the command "yield accumulation 1" is to be transmitted once to an address "matsumoto@krl.mec" by an electric mail at the urgent informing level.

The contents set in the informing method setting file of FIG. 15(c) mean that the execution result of the command "priority lot dedicated processing 1" and a command "closing number limit 1" is to be transmitted once to a telephone number "7-694-8040" by a telephone at the normal informing level.

Methods of setting information in the function setting file, the start condition setting file or the end condition setting file and the informing method setting file are the same as those described with respect to the methods of setting information in the function setting file and the like in Embodiment 1.

Furthermore, the informing method setting file of FIG. 15(b) or 15(c) can be replaced with a table or a list structure in accordance with the informing method setting format.

[Execution Information Transmitting Process S24]

As is shown in the flowchart for an execution information transmitting process of FIG. 13(b), the execution information transmitting means 206 transmits, to the agent system 220, the command and the execution place set in the function setting file, the execution start condition or the execution end condition set in the start condition setting file or the end condition setting file, and the result informing method set in the informing method setting file as the execution information 205.

In the execution information transmitting means 206, file copy using a protocol such as RCP and FTP or file attachment to an electric mail can be adopted as the method of transmitting the execution information 205, namely, the function setting file, the start condition setting file or the end condition setting file and the informing method setting file, to the agent system 220.

Alternatively, in the execution information transmitting means 206, the execution information 205 can be transmitted by using socket communication in which one file is divided into plural data to be reconstructed into one file at a recipient instead of the aforementioned transmitting methods.

Furthermore, the execution information transmitting means 206 can transmit the execution information 205 through plural agent systems to a final agent system, that is, a final recipient.

Now, this transmitting method will be described with reference to FIG. 16(a).

Figure 16A:
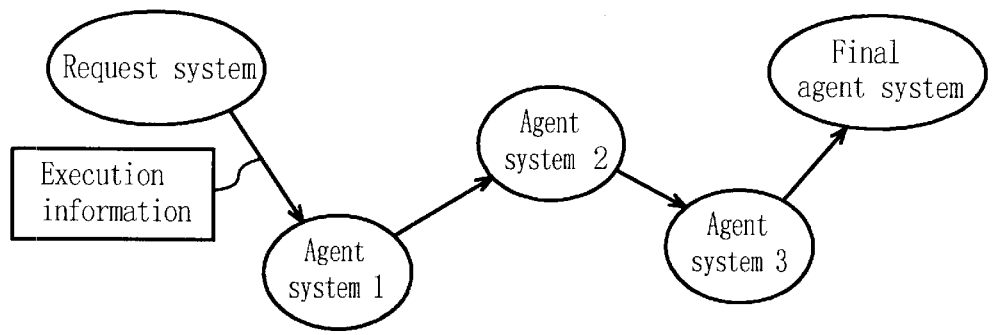
FIG. 16(a) is a diagram for showing one path for transmitting information from a request system to an agent system in the production control method of Embodiment 2 and FIG. 16(b) is a diagram for showing plural paths for transmitting information from a request system to an agent system in the production control method of Embodiment 2.

FIG. 16(a) shows transmission of the execution information 205 from a request system to a final agent system through agent systems 1, 2 and 3. In this case, even when the execution information transmitting means 206 does not directly recognize the final agent system, it can transmit the execution information 205 to the final agent system as far as the respective agent systems through which the execution information 205 passes recognize the subsequent agent systems. Information of recognizable agent systems are stored in a file or a list structure in a storage device accessible from the respective agent systems.

Alternatively, the execution information transmitting means 206 can transmit the execution information 205 to a final agent system through plural agent systems selected so as to minimize the total load of the passed agent systems.

Now, this transmitting method will be described with reference to FIG. 16(b).

Figure 16B:
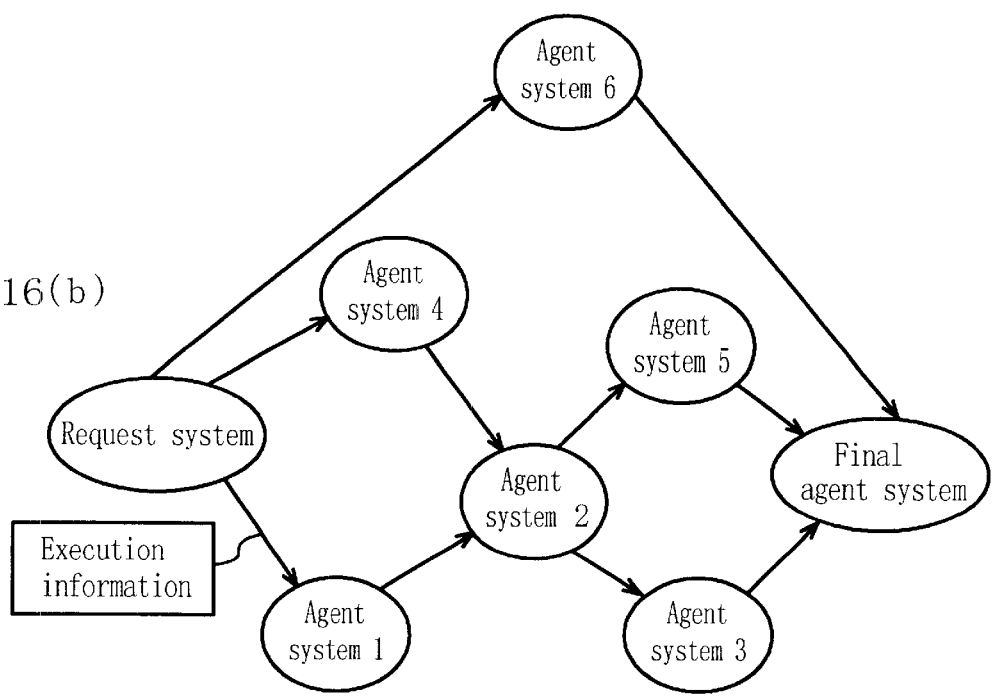
Figure 21A:
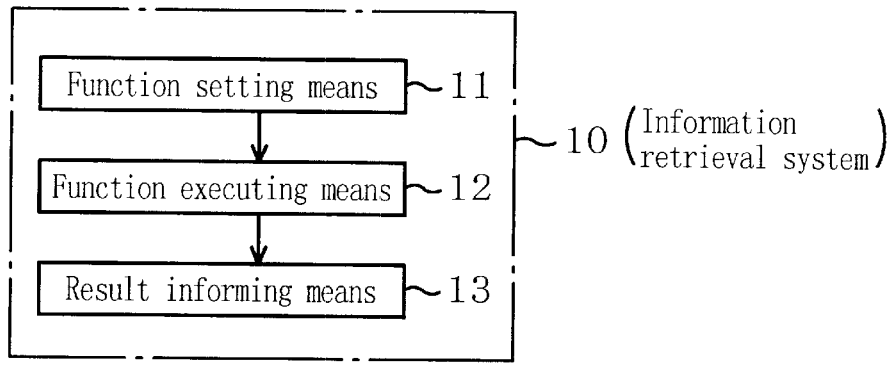
FIG. 21(a) is a block diagram for showing the structure of an information retrieval system exemplified as a conventional production control system.
Figure 21B:
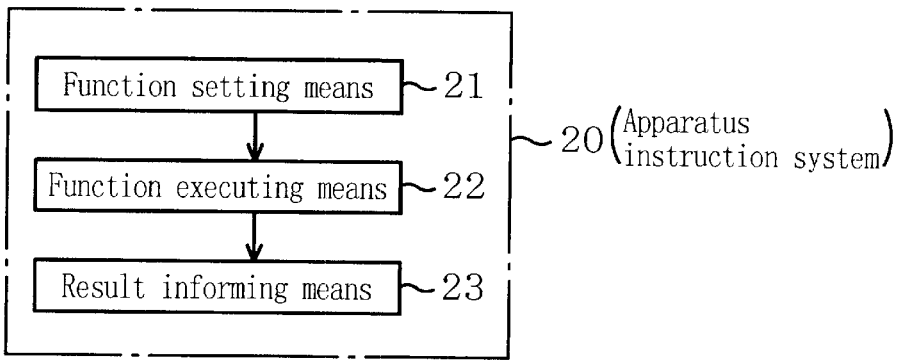
FIG. 21(b) is a block diagram for showing the structure of an apparatus instruction system exemplified as the conventional production control system and FIG. 21(c) is a block diagram for showing the structure of a production plan registration system exemplified as the conventional production control system.
Figure 21C:
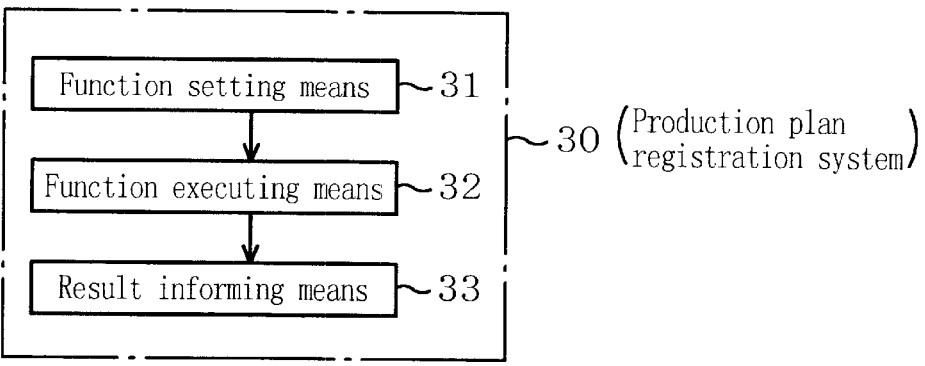

FIG. 16(b) shows transmission of the execution information 205 from a request system to a final agent system through plural paths, specifically the following five paths:

Path 1: Request system→Agent system 1→Agent system 2→Agent system 3→Final agent system Path 2: Request system→Agent system 1→Agent system 2→Agent system 5→Final agent system Path 3: Request system→Agent system 4→Agent system 2→Agent system 3→Final agent system Path 4: Request system→Agent system 4→Agent system 2→Agent system 5→Final agent system Path 5: Request system→Agent system 6→Final agent system When the execution information 205 can be transmitted through plural paths as is shown in FIG. 16(b), the execution information transmitting means 206 selects, by using, for example, a load supervisory table of FIG. 17, a path with a minimum total load of agent systems included therein (specifically, the path 3 in the case of FIG. 16(b)), so as to transmit the execution information 205 to the final agent system.

The load supervisory table of FIG. 17 is a table used in a storage device controlled by a computer including, as its items, start points, end points and loads. The execution information transmitting means 206 extracts load information between the respective agent systems passed by the execution information 205 from the load supervisory table, and selects a path having a minimum total load, through which the execution information 205 is transmitted to the final agent system.

Alternatively, the execution information transmitting means 206 can transmit the execution information 205 to a final agent system through plural agent systems selected not in consideration of the loads but so as to make the execution information 205 pass through a minimum number of agent systems (namely, through the path 5 in the case of FIG. 16(b)).

[Execution Information Receiving Process S25]

As is shown in the flowchart for an execution information receiving process of FIG. 13(c), the execution information receiving means 221 receives the execution information 205 transmitted from the execution information transmitting means 206, and stores the function setting file, the start condition setting file or the end condition setting file, and the informing method setting file in a storage device controlled by a computer.

[Function Controlling Process S26]

Similarly to Embodiment 1, as is shown in the flowchart for a function executing process in a function controlling process of FIG. 4(a), the function executing means 222 extracts the command and the execution place from the function execution part of the function setting file and the execution start condition from the start condition setting file. Then, also similarly to Embodiment 1, by using the extracted command and execution place as keys, the function executing means 222 extracts a local command, a system name and an inquiry method from a command conversion table shown in FIG. 8 repeatedly in the number of times corresponding to the number of extracted commands and execution places.

Next, the function executing means 222 periodically checks whether or not the execution system 210 having the extracted system name satisfies the extracted execution start condition by using the extracted inquiry method. When the execution system 210 satisfies the execution start condition, the function executing means 222 instructs the execution system 210 to start execution of the extracted local command, receives an execution result from the execution system 210 obtained by carrying out the local command directed to the execution system 210, and stores the received execution result in a result return file shown in FIG. 18 in a storage device controlled by a computer. The instruction to start execution of the local command and the storage of the execution result in the result return file are conducted repeatedly in the number of times corresponding to the number of extracted local commands.

The contents stored in the result return file of FIG. 18 mean that the execution result of a local command "YIELD1" (corresponding to the accumulation of the yield information of LSIs) is 76% in an execution system "PRINCE" of a factory A.

Furthermore, similarly to Embodiment 1, as is shown in the flowchart for a function ending process in the function controlling process of FIG. 4(a), the function ending means 223 extracts the command and the execution place from the function end part of the function setting file and the execution end condition from the end condition setting file. Then, also similarly to Embodiment 1, by using the extracted command and execution place as keys, the function ending means 223 extracts a local command, a system name and an inquiry method from the command conversion table of FIG. 8 repeatedly in the number of times corresponding to the number of extracted commands and execution places.

Next, the function ending means 223 periodically checks whether or not the execution system 210 having the extracted system name satisfies the extracted execution end condition by using the extracted inquiry method. When the execution system 210 satisfies the execution end condition, the function ending means 223 instructs the execution system 210 to end the execution of the extracted local command, receives an execution result from the execution system 210 obtained by carrying out the local command directed to the execution system 210, and stores the received execution result in a result return file of FIG. 19 in a storage device controlled by a computer. The instruction to end the execution of the local command and the storage of the execution result in the result return file are conducted repeatedly in the number of times corresponding to the number of extracted local commands.

The contents stored in the result return file of FIG. 19 mean that the execution result of a local command "PTC1" (corresponding to the dedicated processing for the higher priority lot) is normal termination in an execution system "SOLOM" of a laboratory C.

The result return file of FIG. 18 or 19 can be replaced with a table or a list structure having the same contents.

Furthermore, the function executing means 222 or the function ending means 223 periodically checks whether or not the execution system 210 satisfies the execution start condition or the execution end condition in this embodiment. Instead, the execution system 210 can inform the function executing means 222 or the function ending means 223 that it satisfies the execution start condition or the execution end condition.

[Result Transmitting Process S27]

Figure 14A:
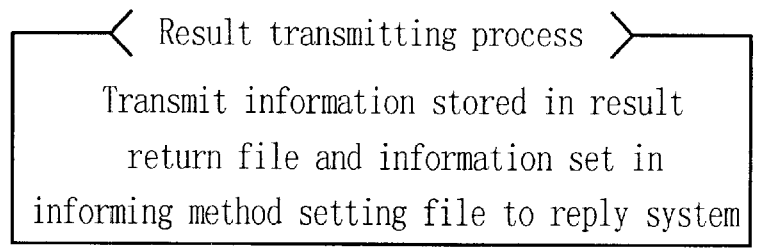
FIG. 14(a) is a flowchart for showing procedures in a result transmitting process in the production control method of Embodiment 2.

As is shown in the flowchart for a result transmitting process of FIG. 14(a), the result transmitting means 225 transmits, to the reply system 240, the execution result stored in the result return file and the result informing method set in the informing method setting file as the execution result information 224.

In the result transmitting means 225, file copy using a protocol such as RCP and FTP or file attachment to an electric mail can be adopted as a method of transmitting the execution result information 224, namely, the result return file and the informing method setting file, to the reply system 240.

Alternatively, in the result transmitting means 225, the execution result information 224 can be transmitted by using socket communication in which one file is divided into plural data to be reconstructed into one file at a recipient instead of the aforementioned transmitting methods.

Furthermore, similarly to the execution information transmitting means 206, the result transmitting means 225 can transmit the execution result information 224 through plural agent systems to the reply system 240.

Also, similarly to the execution information transmitting means 206, the result transmitting means 225 can transmit the execution result information 224 to the reply system 240 through plural agent systems selected so that the total load of the passed agent systems can be minimum.

Furthermore, similarly to the execution information transmitting means 206, the result transmitting means 225 can transmit the execution result information 224 to the reply system 240 through plural agent systems selected not in consideration of the loads of the passed agent systems but so as to make the execution result information 224 pass through a minimum number of agent systems.

[Result Receiving Process S28]

Figure 14B:
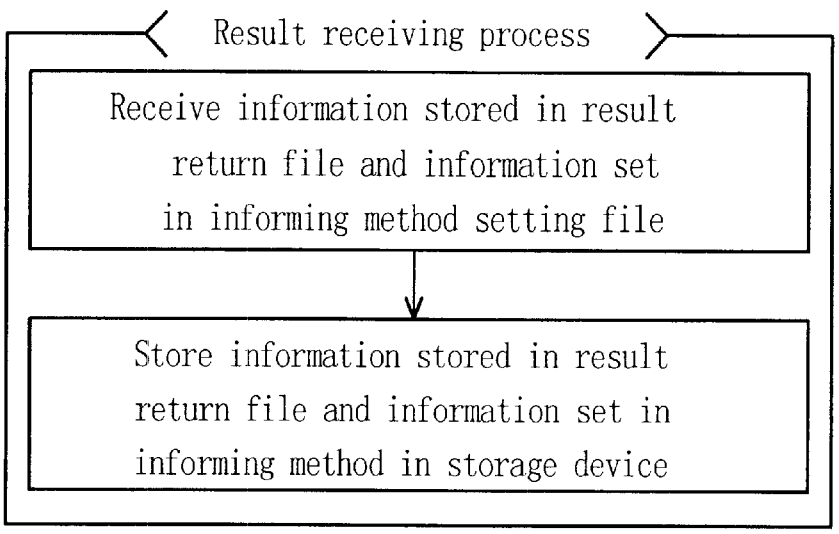
FIG. 14(b) is a flowchart for showing procedures in a result receiving process in the production control method of Embodiment 2 and FIG. 14(c) is a flowchart for showing procedures in a result informing process in the production control method of Embodiment 2.

As is shown in the flowchart for a result receiving process of FIG. 14(b), the result receiving means 241 receives the execution result information 224 transmitted from the agent system 220 and stores the result return file and the informing method setting file in a storage device controlled by a computer.

[Result Informing Process S29]

Figure 14C:
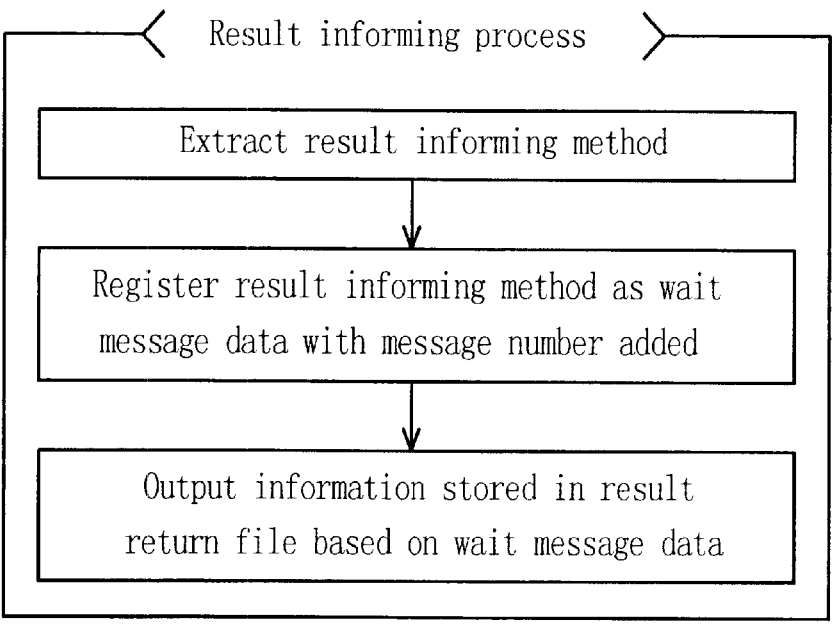

As is shown in the flowchart for a result informing process of FIG. 14(c), the result informing means 242 extracts the recipient (the message device and its address), the informing level and the informing mode from the informing method setting file, registers the extracted data in a wait message table of FIG. 20 with a message number added thereto, and registers the message number in the result return file.

The wait message table of FIG. 20 is a table used in a storage device controlled by a computer including, as its items, message devices, the addresses of the devices, message numbers, informing levels and informing modes. In providing a message number to the wait message table, natural numbers such as 1, 2 and 3 can be successively used so as to prevent overlap of the message numbers.

Next, the result informing means 242 outputs the execution result stored in the result return file to the message device 230 on the basis of the wait message table, and then deletes the corresponding data in the wait message table.

Specifically, for example, when an execution result is to be output to an electric mail, the result informing means 242 periodically extracts, from the wait message table, an address of a device, a message number, an informing level and an informing mode by using "EMAIL" as a retrieval key, and transmits the data of the result return file to an electric mail having the extracted address in the ascending order of extracted message numbers. At this point, regardless of the message numbers, execution result information provided with the "urgent" informing level is priorly transmitted, and execution result information provided with the "always" informing mode is repeatedly transmitted until the receipt thereof is confirmed by a recipient.

In Embodiment 2, a function name indicating the kind of an executive function, a manufacturing plant where the executive function is to be executed, and an execution start condition or an execution end condition for the executive function are set in the request system 200. Then, the agent system 220 instructs any of the execution systems 210 working in the set manufacturing plant to start or end the executive function indicated by the set function name when the set execution start or end condition is satisfied, so that the execution system 210 can start or end execution of the executive function in accordance with the instruction.

Accordingly, merely by setting a function name, a manufacturing plant and an execution start or end condition, the execution system 210 working in the set manufacturing plant can start or end the execution of the executive function indicated by the set function name when the set execution start or end condition is satisfied. Therefore, there is no need to be skillful in the operating method or function of the execution system 210 in order to start or end the execution of the executive function. Accordingly, for example, when information retrieval or processing for products is set as the executive function together with plural manufacturing plants in the request system 200, the information retrieval can be started or the processing for products can be ended simultaneously in the plural manufacturing plants by using a common request format, and hence, time required for the operation can be shortened. Furthermore, for example, when a proceeding state of a lot or the like is set as the execution start condition or the execution end condition together with the information retrieval or the processing for products set as the executive function in the request system 200, the information retrieval can be started or the processing for products can be ended timely in accordance with the proceeding state of the lot.

Moreover, according to Embodiment 2, the result informing means 224 outputs an execution result obtained by carrying out the executive function directed to the execution system 210 to the message device 230. Accordingly, various execution results can be output in a common format, and hence, the contents of execution results can be easily understood. Furthermore, the result informing means 242 outputs an execution result to the message device 230 on the basis of a result informing method set by the informing method setting means 204. Therefore, for example, by setting a recipient (a predetermined message device and its address) as the result informing method, the execution result can be definitely output to the predetermined message device 230, and hence, the execution result can be definitely received.

Furthermore, since the execution information transmitting means 206 can transmit the execution information 205 to an agent system corresponding to a final recipient through plural agent systems in Embodiment 2, the execution information 205 can be transmitted to an agent system not directly recognized by the execution information transmitting means 206.

In addition, in Embodiment 2, the execution information transmitting means 206 can transmit the execution information 205 to an agent system corresponding to a final recipient through plural agent systems selected so that the total load of the passed agent systems can be minimum. Therefore, the execution information 205 can be efficiently transmitted to the agent system corresponding to the final recipient.

Alternatively, in Embodiment 2, the execution information transmitting means 206 can transmit the execution information 205 to an agent system corresponding to a final recipient through plural agent systems selected so that the execution information 205 can pass through a minimum number of agent systems. Therefore, the execution information 205 can be easily transmitted to the agent system corresponding to the final recipient.

Moreover, since a result informing method is set by the informing method setting means 204 by using a Web browser, an electric mail software, a telephone or the like in Embodiment 2, a result informing method can be easily set without being skillful in the operating method of the execution system 210.

Furthermore, in Embodiment 2, a result informing method set by the informing method setting means 204 includes an informing level corresponding to the degree of urgency in outputting, to the message device 230, an execution result obtained by executing an executive function by the execution system 210, and the result informing means 242 outputs the execution result on the basis of the informing level to the message device 230. Therefore, an execution result with higher urgency can be priorly output to the message device 230.

Also, in Embodiment 2, a result informing method set by the informing method setting means 204 includes an informing mode indicating whether or not receipt of an execution result by the message device 230 should be confirmed in outputting, to the message device 230, the execution result obtained by executing an executive function by the execution system 210. Additionally, when the informing mode is set to confirm the receipt of the execution result by the message device 230, the result informing means 242 outputs the execution result repeatedly to the message device 230 until the receipt of the execution result is confirmed by the message device 230. Therefore, an important execution result can be definitely output to the message device 230.

Furthermore, the result transmitting means 225 can transmit the execution result information 224 to the reply system 240 through plural agent systems in Embodiment 2. Therefore, the execution result information 224 can be transmitted to the reply system 240 even when the reply system 240 is not directly recognized by the result transmitting means 225.

In addition, in Embodiment 2, the result transmitting means 225 can transmit the execution result information 224 to the reply system 240 through plural agent systems selected so that the total load of the passed agent systems can be minimum. Therefore, the execution result information 224 can be efficiently transmitted to the reply system 240.

Alternatively, in Embodiment 2, the result transmitting means 225 can transmit the execution result information 224 to the reply system 240 through plural agent systems selected so that the execution result information 224 can pass through a minimum number of agent systems. Therefore, the execution result information 224 can be easily transmitted to the reply system 240.

In Embodiment 2, the request system 200 includes the start condition setting means 202 (for setting an execution start condition for an executive function in a file or the like) and the end condition setting means 203 (for setting an execution end condition for an executive function in a file or the like). Instead, the request system 200 can include execution condition setting means for setting an execution start condition or an execution end condition for an executive function in a file or the like.

Furthermore, in Embodiment 2, the agent system 220 includes the function executing means 222 (for determining whether or not an execution start condition included in the execution information 205 is satisfied, and when it is satisfied, for instructing any of the execution systems 210 working in a manufacturing plant included in the execution information 205 to start execution of an executive function indicated by a function name included in the execution information 205, receiving an execution result from the execution system 210 obtained by carrying out the executive function directed to the execution system 210 and storing the received execution result in a file or the like); and the function ending means 223 (for determining whether or not an execution end condition included in the execution information 205 is satisfied, and when it is satisfied, for instructing any of the execution systems 210 working in a manufacturing plant included in the execution information 205 to end execution of an executive function indicated by a function name included in the execution information 205, receiving an execution result from the execution system 210 obtained by carrying out the executive function directed to the execution system 210 and storing the received execution result in a file or the like). Instead, the agent system 220 can include function controlling means for determining whether or not an execution start condition or an execution end condition included in the execution information 205 is satisfied, and when it is satisfied, for instructing any of the execution systems 210 working in a manufacturing plant included in the execution information 205 to start or end execution of an executive function indicated by a function name included in the execution information 205, receiving an execution result from the execution system 210 obtained by carrying out the executive function directed to the execution system 210 and storing the received execution result in a file or the like.

Furthermore, in Embodiment 2, the execution information transmitting means 206 transmits the execution information 205 to an agent system corresponding to a final recipient through plural agent systems selected so that the total load of the passed agent systems can be minimum. Instead, the execution information transmitting means 206 can transmit the execution information 205 to the agent system corresponding to the final recipient through plural agent systems selected so that the total load of the passed agent systems can be comparatively small, for example, can be the second or third smallest.

Alternatively, in Embodiment 2, the execution information transmitting means 206 transmits the execution information 205 to an agent system corresponding to a final recipient through plural agent systems selected so that the number of the passed agent systems can be minimum. Instead, the execution information transmitting means 206 can transmit the execution information 205 to the agent system corresponding to the final recipient through plural agent systems selected so that the number of the passed agent systems can be comparatively small, for example, can be the second or third smallest.

Furthermore, in Embodiment 2, the result transmitting means 225 transmits the execution result information 224 to the reply system 240 through plural agent systems selected so that the total load of the passed agent systems can be minimum. Instead, the result transmitting means 225 can transmit the execution result information 224 to the reply system 240 through plural agent systems selected so that the total load of the passed agent systems can be comparatively small, for example, can be the second or third smallest.

Alternatively, in Embodiment 2, the result transmitting means 225 transmits the execution result information 224 to the reply system 240 through plural agent systems selected so that the number of the passed agent systems can be minimum. Instead, the result transmitting means 225 can transmit the execution result information 224 to the reply system 240 through plural agent systems selected so that the number of the passed agent systems can be comparatively small, for example, can be the second or third smallest.

When a production control program for realizing the production control method of this embodiment described above is programmed to be recorded in a computer-readable recording medium, the production control program of this embodiment can be loaded in a main storage of a computer by merely mounting the recording medium in an auxiliary storage. Thus, procedures of a desired function can be executed by a CPU of the computer at a predetermined operation timing (event).

What is claimed is:

1. A production control system for controlling apparatuses installed in manufacturing plants by using execution systems, comprising:

a request system for setting an executive function to be executed for controlling any of said apparatuses; and an agent system connected with said execution systems and said request system through a computer network, wherein said request system includes:

function setting means for setting, in a function setting part, a function name indicating a kind of an executive function to be executed and a manufacturing plant where said executive function is to be executed;

execution condition setting means for setting an execution start condition or an execution end condition for said executive function in a start condition setting part or an end condition setting part; and execution information transmitting means for transmitting, to said agent system, said function name and said manufacturing plant set in said function setting part and said execution start condition or said execution end condition set in said start condition setting part or said end condition setting part as execution information, and said agent system includes:

execution information receiving means for receiving said execution information transmitted from said execution information transmitting means;

function controlling means for determining whether or not said execution start condition or said execution end condition included in said execution information received by said execution information receiving means is satisfied, and when said execution start condition or said execution end condition is satisfied, for instructing an execution system working in said manufacturing plant included in said execution information received by said execution information receiving means to start or end execution of said executive function indicated by said function name included in said execution information received by said execution information receiving means, receiving an execution result from said execution system obtained by carrying out said executive function directed to said execution system, and storing said received execution result in a result return part; and result informing means for outputting said execution result stored in said result return part to a message device.

2. The production control system of claim 1, wherein said function setting means sets said function name indicating the kind of said executive function to be executed and said manufacturing plant where said executive function is to be executed by using a Web browser, an electric mail software or a telephone.

3. The production control system of claim 1, wherein said function name indicating the kind of said executive function set by said function setting means is an execution command recognizable to a computer, an HTTP address or an SQL statement.

4. The production control system of claim 1, wherein said execution condition setting means sets said execution start condition or said execution end condition for said executive function in said start condition setting part or said end condition setting part by using a Web browser, an electric mail software or a telephone.

5. The production control system of claim 1, wherein said execution start condition or said execution end condition for said executive function set by said execution condition setting means includes temporary halt or re-start of said executive function or another function.

6. A production control system for controlling apparatuses installed in manufacturing plants by using execution systems, comprising:

a request system for setting an executive function to be executed for controlling any of said apparatuses;

an agent system connected with said execution systems and said request system through a computer network; and a reply system connected with said agent system through a computer network, wherein said request system includes:

function setting means for setting, in a function setting part, a function name indicating a kind of an executive function to be executed and a manufacturing plant where said executive function is to be executed;

execution condition setting means for setting an execution start condition or an execution end condition for said executive function in a start condition setting part or an end condition setting part;

informing method setting means for setting, in an informing method setting part, a result informing method for outputting, to a message device, an execution result obtained by carrying out said executive function by any of said execution systems; and execution information transmitting means for transmitting, to said agent system, said function name and said manufacturing plant set in said function setting part, said execution start condition or said execution end condition set in said start condition setting part or said end condition setting part, and said result informing method set in said informing method setting part as execution information, said agent system includes:

execution information receiving means for receiving said execution information transmitted from said execution information transmitting means;

function controlling means for determining whether or not said execution start condition or said execution end condition included in said execution information received by said execution information receiving means is satisfied, and when said execution start condition or said execution end condition is satisfied, for instructing an execution system working in said manufacturing plant included in said execution information received by said execution information receiving means to start or end execution of said executive function indicated by said function name included in said execution information received by said execution information receiving means, receiving an execution result from said execution system obtained by carrying out said executive function directed to said execution system, and storing said received execution result in a result return part; and result transmitting means for transmitting, to said reply system, said execution result stored in said result return part and said result informing method included in said execution information received by said execution information receiving means as execution result information, and said reply system includes:
result receiving means for receiving said execution result information transmitted from said result transmitting means; and
result informing means for outputting, to said message device, said execution result included in said execution result information received by said result receiving means on the basis of said result informing method included in said execution result information received by said result receiving means.

7. The production control system of claim 6,
wherein said execution information transmitting means transmits said execution information to an agent system corresponding to a final recipient through plural agent systems.

8. The production control system of claim 6,
wherein said execution information transmitting means transmits said execution information to an agent system corresponding to a final recipient through plural agent systems selected so as to minimize a total load of said agent systems through which said execution information is transmitted.

9. The production control system of claim 6,
wherein said execution information transmitting means transmits said execution information to an agent system corresponding to a final recipient through plural agent systems selected so as to make comparatively small a total load of said agent systems through which said execution information is transmitted.

10. The production control system of claim 6,
wherein said execution information transmitting means transmits said execution information to an agent system corresponding to a final recipient through plural agent systems selected so as to minimize a number of said agent systems through which said execution information is transmitted.

11. The production control system of claim 6,
wherein said execution information transmitting means transmits said execution information to an agent system corresponding to a final recipient through plural agent systems selected so as to make comparatively small a number of said agent systems through which said execution information is transmitted.

12. The production control system of claim 6,
wherein said informing method setting means sets said result informing method in said informing method setting part by using a Web browser, an electric mail software or a telephone.

13. The production control system of claim 6,
wherein said result informing method set by said informing method setting means includes an informing level corresponding to a degree of urgency in outputting, to said message device, said execution result obtained by carrying out said executive function by said execution system, and
said result informing means outputs said execution result to said message device on the basis of said informing level.

14. The production control system of claim 6,
wherein said result informing method set by said informing method setting means includes an informing mode for indicating whether or not to confirm receipt of said execution result by said message device in outputting said execution result obtained by carrying out said executive function by said execution system, and
when said informing mode is set to confirm receipt of said execution result by said message device, said result informing means repeatedly outputs said execution result to said message device until the receipt of said execution result is confirmed by said message device.

15. The production control system of claim 6,
wherein said result transmitting means transmits said execution result information to said reply system through plural agent systems.

16. The production control system of claim 6,
wherein said result transmitting means transmits said execution result information to said reply system through plural agent systems selected so as to minimize a total load of said agent systems through which said execution result information is transmitted.

17. The production control system of claim 6,
wherein said result transmitting means transmits said execution result information to said reply system through plural agent systems selected so as to make comparatively small a total load of said agent systems through which said execution result information is transmitted.

18. The production control system of claim 6,
wherein said result transmitting means transmits said execution result information to said reply system through plural agent systems selected so as to minimize a number of said agent systems through which said execution result information is transmitted.

19. The production control system of claim 6,
wherein said result transmitting means transmits said execution result information to said reply system through plural agent systems selected so as to make comparatively small a number of said agent systems through which said execution result information is transmitted.

20. A production control method for controlling apparatuses installed in manufacturing plants by using execution systems, comprising the steps of:
setting, by using a request system for setting an executive function to be executed for controlling any of said apparatuses, a function name indicating a kind of said executive function, a manufacturing plant where said executive function is to be executed, and an execution start condition or an execution end condition for said executive function;
transmitting, by using said request system, said set function name, said set manufacturing plant and said set execution start condition or said set execution end condition as execution information to an agent system connected with said execution systems and said request system through a computer network; and
by using said agent system, receiving said execution information transmitted from said request system, determining whether or not said execution start condition or said execution end condition included in said execution information is satisfied, and when said execution start condition or said execution end condition is satisfied, instructing an execution system working in said manufacturing plant included in said execution information to start or end execution of said executive function indicated by said function name included in said execution information, receiving an execution result from said execution system obtained by carrying out said executive function directed to said execution system, and outputting said execution result to a message device.

21. The production control method of claim 20, wherein said function name indicating the kind of said executive function set by said request system is an execution command recognizable to a computer, an HTTP address or an SQL statement.

22. The production control method of claim 20, wherein said execution start condition or said execution end condition for said executive function set by said request system includes temporary halt or re-start of said executive function or another function.

23. A production control method for controlling apparatuses installed in manufacturing plants by using execution systems, comprising the steps of:

setting, by using a request system for setting an executive function to be executed for controlling any of said apparatuses, a function name indicating a kind of said executive function, a manufacturing plant where said executive function is to be executed, an execution start condition or an execution end condition for said executive function, and a result informing method for outputting, to a message device, an execution result obtained by carrying out said executive function by any of said execution systems;

transmitting, by using said request system, said set function name, said set manufacturing plant, said set execution start condition or said set execution end condition and said set result informing method as execution information to an agent system connected with said execution systems and said request system through a computer network;

by using said agent system, receiving said execution information transmitted from said request system, determining whether or not said execution start condition or said execution end condition included in said execution information is satisfied, and when said execution start condition or said execution end condition is satisfied, instructing an execution system working in said manufacturing plant included in said execution information to start or end execution of said executive function indicated by said function name included in said execution information, receiving an execution result from said execution system obtained by carrying out said executive function directed to said execution system, and transmitting, as execution result information, said execution result and said result informing method included in said execution information to a reply system connected with said agent system through a computer network; and by using said reply system, receiving said execution result information transmitted from said agent system and outputting, to said message device, said execution result included in said execution result information on the basis of said result informing method included in said execution result information.

24. The production control method of claim 23, wherein said result informing method set by said request system includes an informing level corresponding to a degree of urgency in outputting, to said message device, said execution result obtained by carrying out said executive function by said execution system, and said reply system outputs said execution result to said message device on the basis of said informing level.

25. The production control method of claim 23, wherein said result informing method set by said request system includes an informing mode for indicating whether or not to confirm receipt of said execution result by said message device in outputting said execution result obtained by carrying out said executive function by said execution system, and when said informing mode is set to confirm receipt of said execution result by said message device, said reply system repeatedly outputs said execution result to said message device until the receipt of said execution result is confirmed by said message device.

26. The production control method of claim 23, wherein said request system transmits said execution information to an agent system corresponding to a final recipient through plural agent systems.

27. The production control method of claim 23, wherein said request system transmits said execution information to an agent system corresponding to a final recipient through plural agent systems selected so as to minimize a total load of said agent systems through which said execution information is transmitted.

28. The production control method of claim 23, wherein said request system transmits said execution information to an agent system corresponding to a final recipient through plural agent systems selected so as to make comparatively small a total load of said agent systems through which said execution information is transmitted.

29. The production control method of claim 23, wherein said request system transmits said execution information to an agent system corresponding to a final recipient through plural agent systems selected so as to minimize a number of said agent systems through which said execution information is transmitted.

30. The production control method of claim 23, wherein said request system transmits said execution information to an agent system corresponding to a final recipient through plural agent systems selected so as to make comparatively small a number of said agent systems through which said execution information is transmitted.

31. The production control method of claim 23, wherein said agent system transmits said execution result information to said reply system through plural agent systems.

32. The production control method of claim 23, wherein said agent system transmits said execution result information to said reply system through plural agent systems selected so as to minimize a total load of said agent systems through which said execution result information is transmitted.

33. The production control method of claim 23, wherein said agent system transmits said execution result information to said reply system through plural agent systems selected so as to make comparatively small a total load of said agent systems through which said execution result information is transmitted.

34. The production control method of claim 23, wherein said agent system transmits said execution result information to said reply system through plural agent systems selected so as to minimize a number of said agent systems through which said execution result information is transmitted.

35. The production control method of claim 23, wherein said agent system transmits said execution result information to said reply system through plural agent systems selected so as to make comparatively small a number of said agent systems through which said execution result information is transmitted.

* * * * *